(12) United States Patent
Alten

(10) Patent No.: US 7,197,142 B2
(45) Date of Patent: Mar. 27, 2007

(54) SYSTEM AND METHODS FOR A VERNAM STREAM CIPHER

(76) Inventor: Alexander I. Alten, 9229 Klemetson Dr., Pleasanton, CA (US) 94588

( * ) Notice: Subject to any disclaimer, the term of this patent is extended or adjusted under 35 U.S.C. 154(b) by 803 days.

(21) Appl. No.: 09/938,790

(22) Filed: Aug. 24, 2001

(65) Prior Publication Data

US 2003/0039357 A1    Feb. 27, 2003

(51) Int. Cl.
*H04L 9/26* (2006.01)
*H04L 9/18* (2006.01)
*G06F 7/58* (2006.01)

(52) U.S. Cl. .......................................... 380/46; 380/42
(58) Field of Classification Search .................. 380/28, 380/37, 277–279, 44–47, 42, 43
See application file for complete search history.

(56) References Cited

U.S. PATENT DOCUMENTS

| 1,310,719 | A |   | 7/1919  | Vernam            |        |
|-----------|---|---|---------|-------------------|--------|
| 1,479,846 | A |   | 1/1924  | Vernam            |        |
| 4,908,861 | A |   | 3/1990  | Brachtl et al.    |        |
| 5,295,188 | A | * | 3/1994  | Wilson et al.     | 380/30 |
| 5,434,806 | A |   | 7/1995  | Hofverberg        |        |
| 5,454,039 | A |   | 9/1995  | Coppersmith et al.|        |
| 5,623,549 | A | * | 4/1997  | Ritter            | 380/37 |
| 5,696,828 | A | * | 12/1997 | Koopman, Jr.      | 380/46 |
| 5,727,062 | A | * | 3/1998  | Ritter            | 380/37 |
| 5,940,002 | A |   | 8/1999  | Finn et al.       |        |
| 5,960,086 | A |   | 9/1999  | Atalla            |        |
| 6,088,449 | A |   | 7/2000  | Atalla            |        |
| 6,334,190 | B1|   | 12/2001 | Silverbrook et al.|        |
| 6,868,495 | B1| * | 3/2005  | Glover            | 713/190|

OTHER PUBLICATIONS

Schneier, Bruce. Applied Cryptography, Second Edition: Protocols, Algorithms, and Source Code in C. John Wiley & Sons, Inc. 1996. pp. 15-17, 47-52.*
Bayer and Diaconis, Trailing the Dovetail Shuffle To Its Liar, The Annals of Applied Probability, vol. 2, Issue 2, May 1992, pp. 294-313.
Preneel, State of Hash Functions, Feb. 26, 1998, Belgium, pp. 1-40.
Stark et al, Information Loss in Card Shuffling, HP Laboratories Bristol, Sep. 16, 1999, pp. 1-14.
Rogaway et al., Software Optimized Encryption Alg, J. of Cryptology, Sep. 18, 1997, pp. 1-16.
Maurer, Conditionally-Perfect Secrecy and Provably Secure Pardomised Cipher, J. of Cryptology, vol. 5, issue 1, 1992, pp. 53-66.
Menezes et al., Handbook of Applied Cryptology, CRC Press, 1997, pp. 20-21, 33, 39-42, 169-171, 191-195, 274, 321-327.

* cited by examiner

*Primary Examiner*—Emmanuel L. Moise
*Assistant Examiner*—Zachary A. Davis
(74) *Attorney, Agent, or Firm*—Valley Oak Law

(57) ABSTRACT

The invention discloses a cryptographic system and consisting of three methods: a cryptographic Vernam stream cipher that permits software programs on separate computers to encrypt and decrypt information; a cryptographic keyed one-way hash that ensures the integrity and authenticity of a message; a non-cyclic pseudo-random number generator that permits a software program inside a computer to create large amounts of pseudo-random bits at high data rates.

11 Claims, 30 Drawing Sheets

Fig. 3
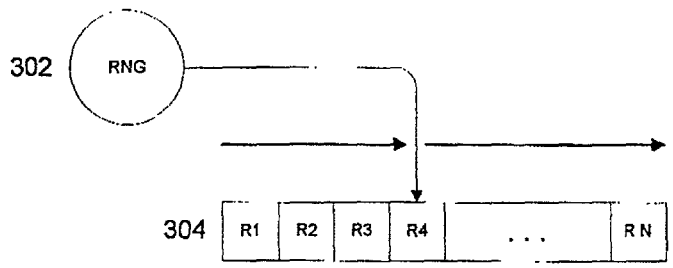
Random Permutation of a Sequence of N Unique Numbers (0 to N-1 Values)
Each of Log2(N) Bits
Fig. 4    Near Perfect Riffle Shuffle Mechanism of Generating a Random
Permutation of a Sequence of Unique Numbers from 0 to N.
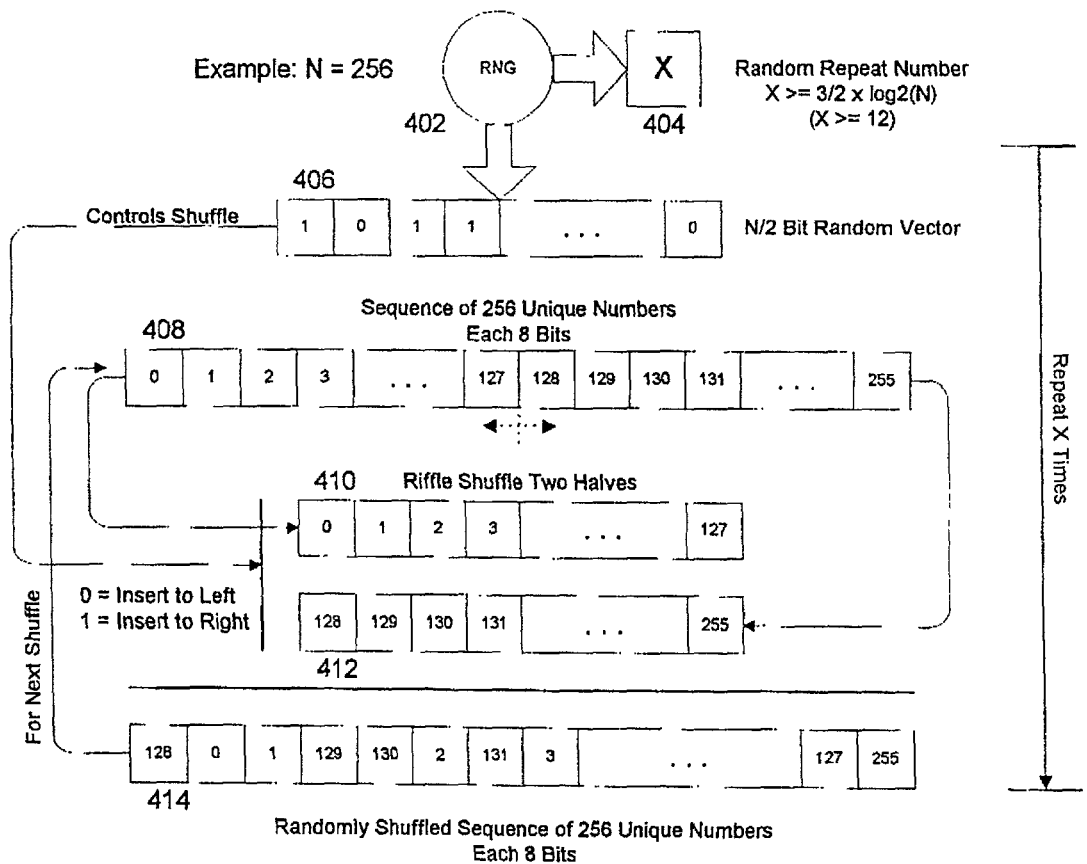
Randomly Shuffled Sequence of 256 Unique Numbers
Each 8 Bits Fig. 5    Randomly Permutating a Sequence of Numbers
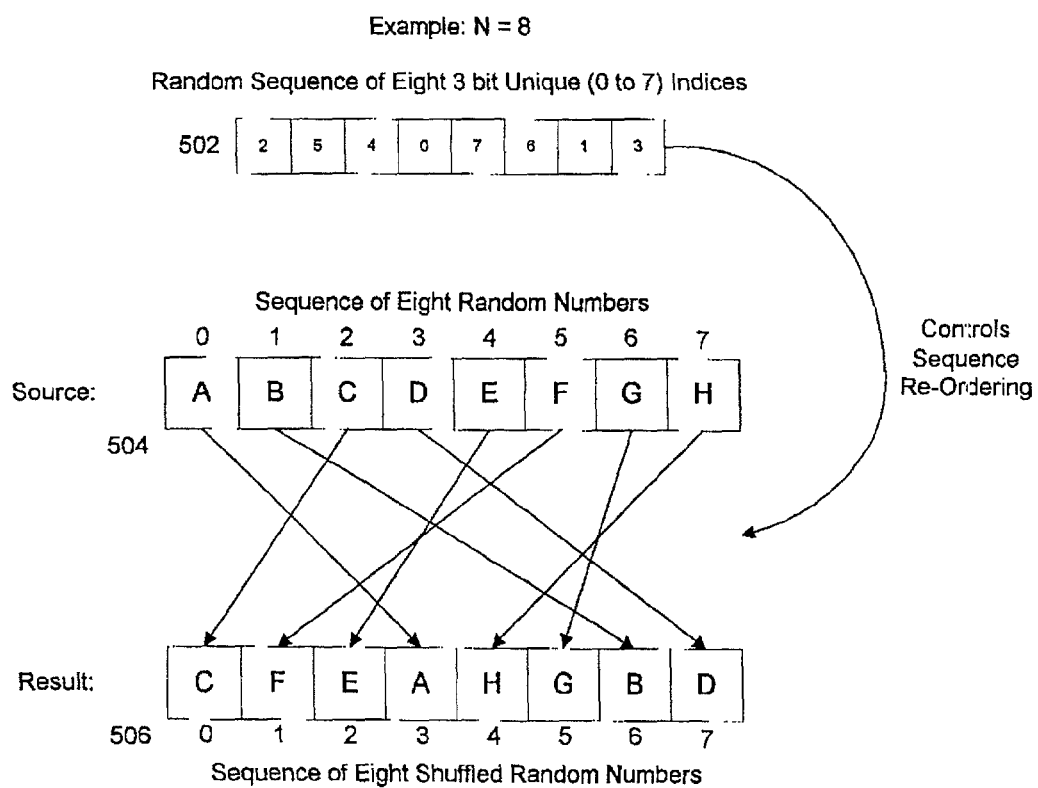

Fig. 6        Key or Seed Data Structure
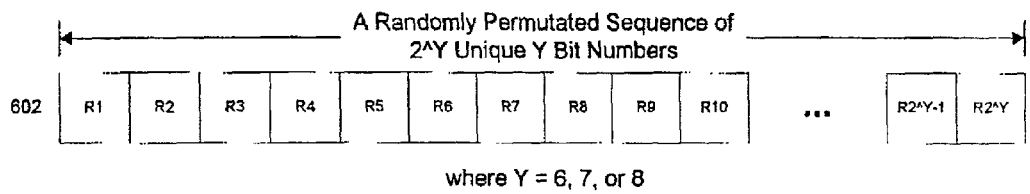
where Y = 6, 7, or 8
Fig. 7        Unit Sizes Used For Partitioning Random Permutations
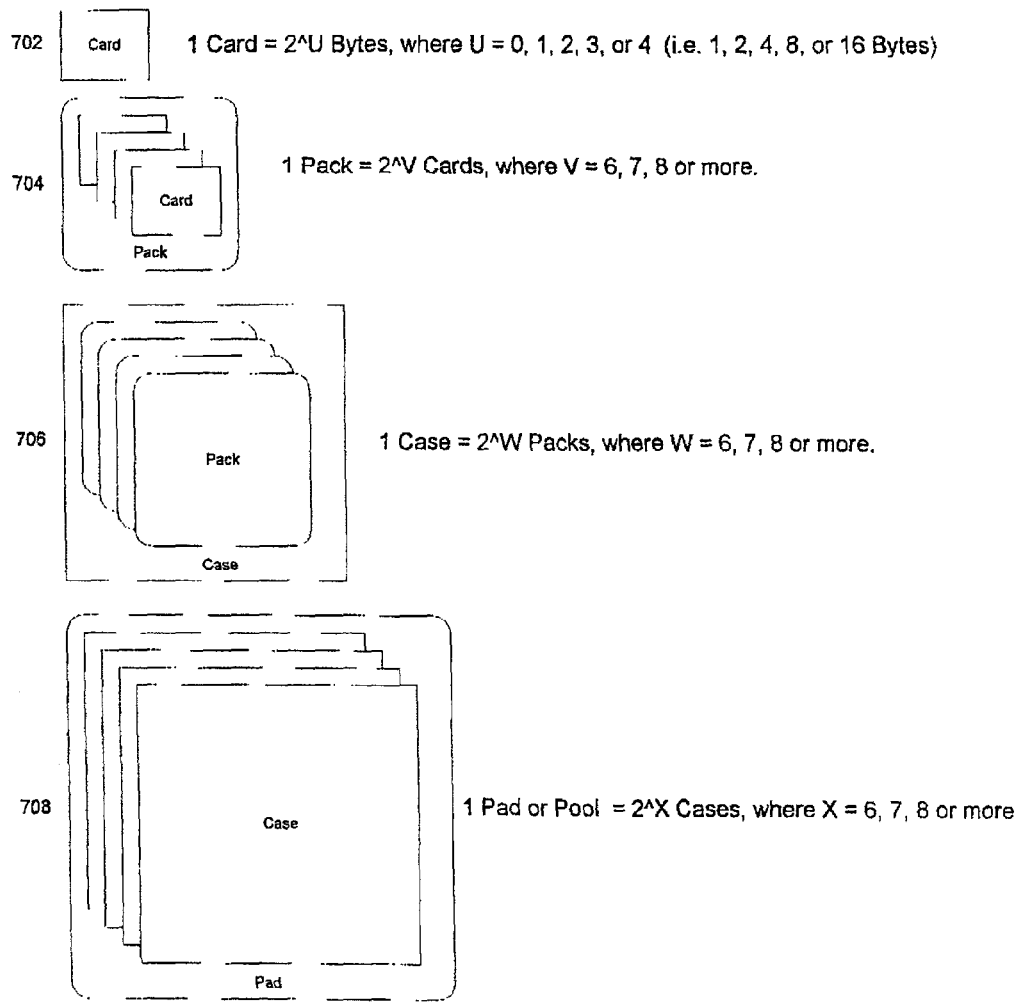
702  1 Card = $2^U$ Bytes, where U = 0, 1, 2, 3, or 4 (i.e. 1, 2, 4, 8, or 16 Bytes)
704  1 Pack = $2^V$ Cards, where V = 6, 7, 8 or more.
706  1 Case = $2^W$ Packs, where W = 6, 7, 8 or more.
708  1 Pad or Pool = $2^X$ Cases, where X = 6, 7, 8 or more Fig. 8    Flow Chart for Nested Shuffle
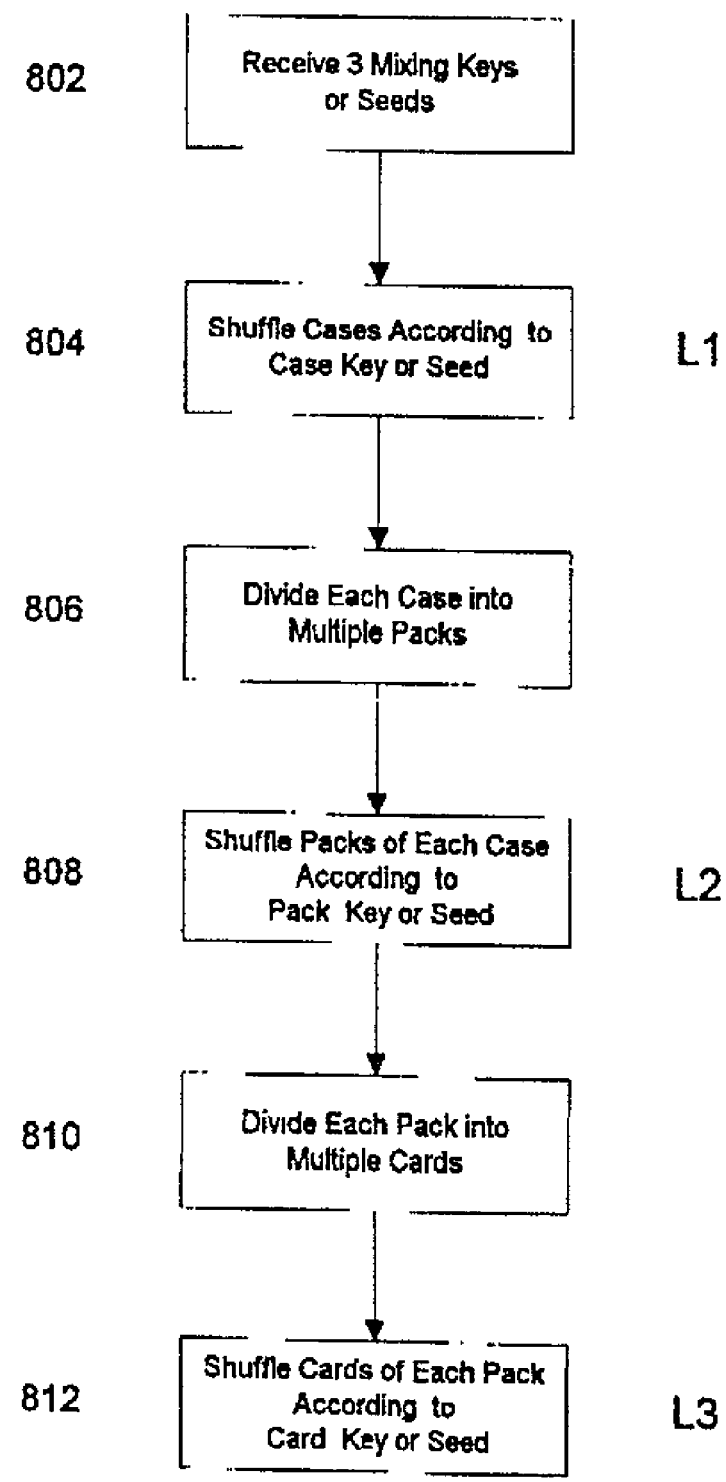

Fig. 9    Nested Shuffle of a Series of Cards
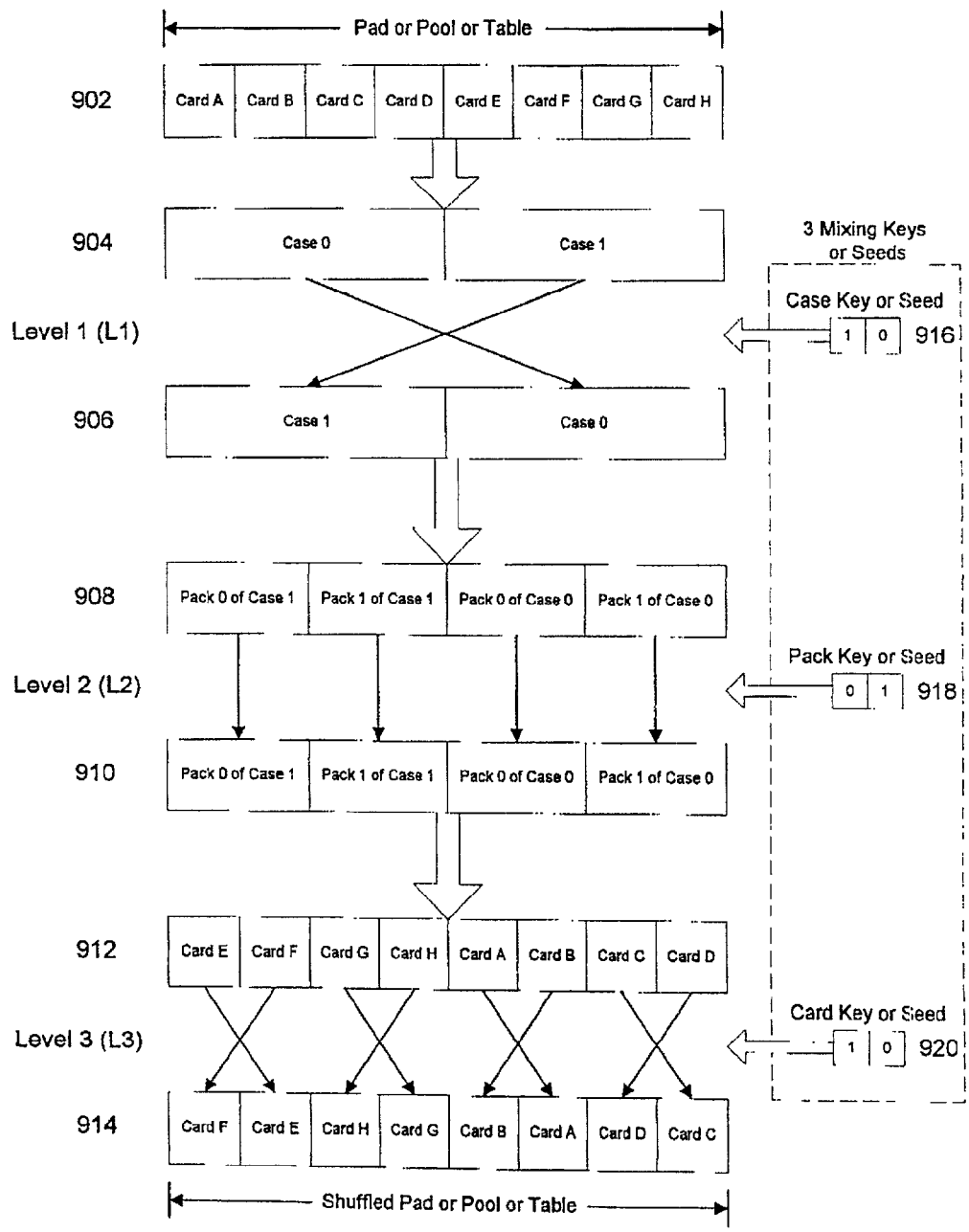

Fig. 10    Non-Cyclic Pseudo-Random Number Generator
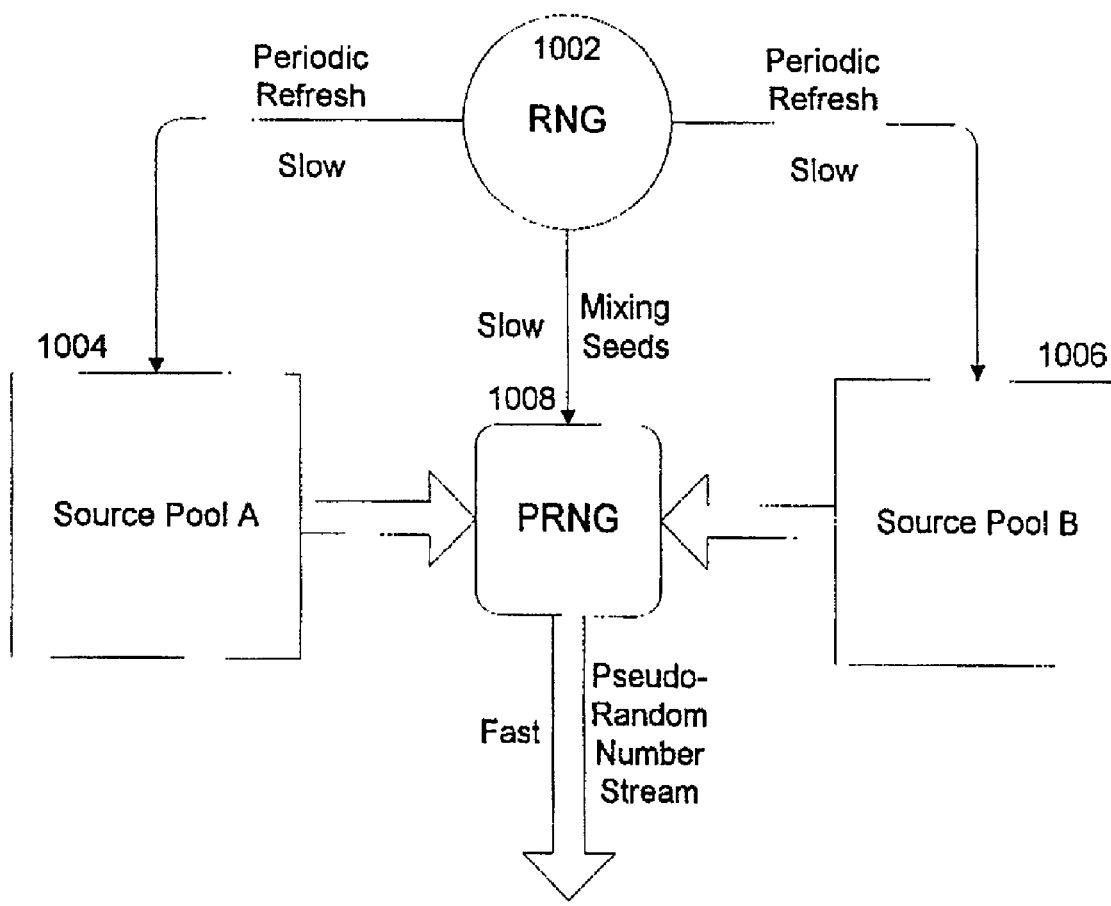

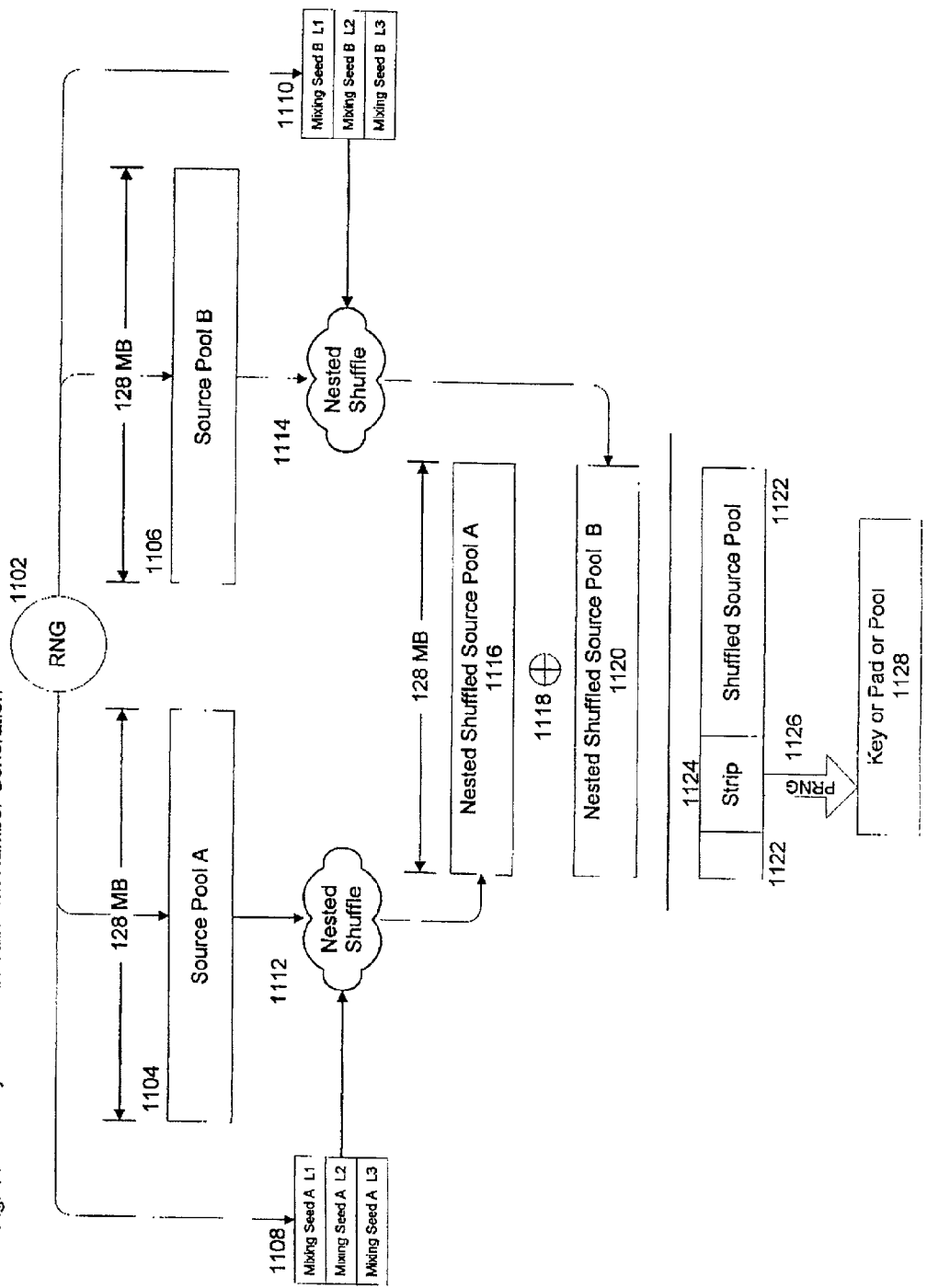
Fig. 11 Non-Cyclic Pseudo-Random Number Generation

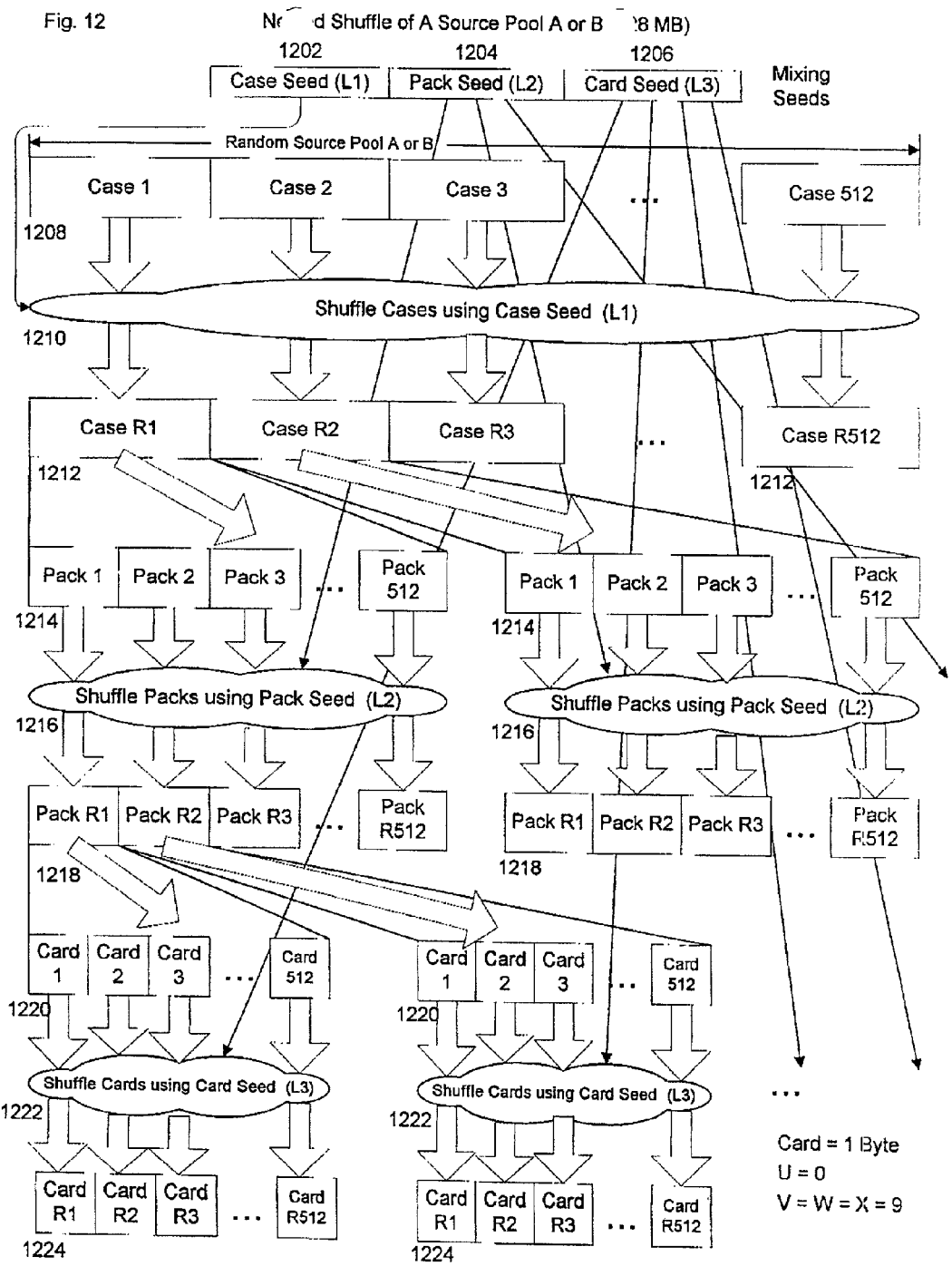

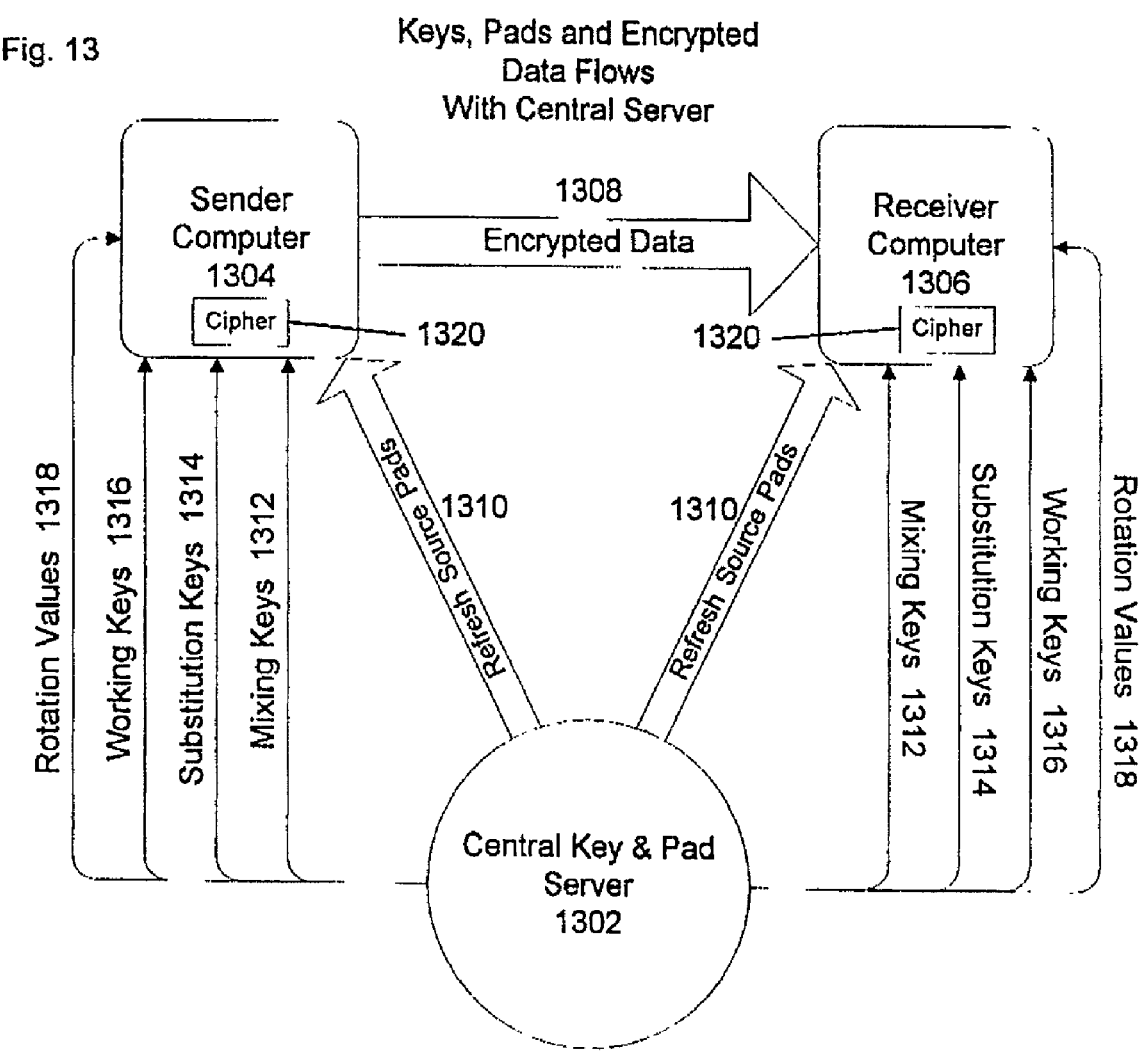
Fig. 13 Keys, Pads and Encrypted Data Flows With Central Server

Fig. 15 ENCRYPTION

Fig. 16 DECRYPTION

Fig. 21 Nested Shuffle Of A Source Pad (16 MB)

Fig. 23  Keyed One-Way Hash Function

Fig. 26 Compressing a 64 Kilobyte Message

Fig. 27  Compressing a 64 Byte Message

SYSTEM AND METHODS FOR A VERNAM STREAM CIPHER

FIELD OF THE INVENTION

This invention relates to cryptographic algorithms in general and in particular to the generation of non-cyclic pseudo-random number sequences, for the encryption and decryption of data, and for the keyed one-way hash of a message.

BACKGROUND OF THE INVENTION

Cryptographic ciphers, keyed one-way hashes and pseudo-random number generators are well known for providing the underpinnings of security systems and secure communication channels. The availability of good commercial quality ciphers and one-way hashes has helped enable commercial data traffic over the insecure Internet. One of the goals of cryptographic ciphers is to encrypt and decrypt efficiently the communication channels between computers, routers and firewalls in such a manner as to scale smoothly from the very high bandwidth fiber optic channels to the slow telephone connections carrying Internet data packet traffic without significantly burdening a host computer's or router's processor. Unfortunately, the computer processing overhead typically needed by standard ciphers in a secure computer network protocol tends to be relatively large compared to what is required to support the non-cryptographic processing portion of that protocol over a communications channel. Moreover, one-way hashes, keyed or not, can add significantly to the processing burden when used in a secure computer network protocol.

In a general form, existing ciphers have been optimized using classic computer programming techniques. However, even the best techniques often only yield nominal performance gains. Ciphers are usually extremely difficult to optimize, via techniques like loop unrolling, because by their very nature they are designed to prevent brute force attack methods that attempt to simplify the cryptographic processing. Even modern ciphers designed with modern microprocessor architectures in mind cannot always take advantage of larger registers, multiple microinstruction pipelines or on-chip caches. This is more problematic with one-way hashes which by design typically compress data bits randomly throughout a data block. One way hashes are difficult to optimize properly on modern microprocessors.

In the class of stream ciphers, Vernam ciphers stand out in their ability to very efficiently encrypt and decrypt without modifying the data payload sizes of computer network protocol packets. The cipher's computational overhead is minimal making it an extremely desirable candidate to encipher computer network communications. Both the USA and Russia use a variant known as a one-time pad system to encipher diplomatic and spy communications. This is theoretically and in practice unbreakable. However it is impractical to implement it in a large-scale security system due to the stupendous amounts of key material that needs to be distributed and managed.

In the early 1990's some stream ciphers were developed that used an internal PRNG seeded with a random key to generate a Vernam key stream. Notable examples are RC4 and SEAL. These ciphers are typically about half a magnitude faster than a comparable block cipher such as DES or AES. Their main limitation is that they cannot randomly access and operate on any part of a data stream. This limits their ability to support datagram protocols like IPv4, where data packets may arrive out of order. Since their key setup costs are high, this also limits their utility in supporting a datagram protocol which may need to rekey frequently, often per packet.

Most security systems that utilize a Vernam stream cipher typically have a very good quality source of large amounts of random bits over a given period of time, to be used for keying materials. The hardware based random number generators typically cannot supply sufficient random bits for this system.

In most security network protocols, packets have their integrity and authenticity ensured during transit over an insecure network channel. A method used is a keyed one-way hash, or message authentication code (MAC). HMAC, using either the MD5 or the SHA-1 hash, has been the utilized for recent Internet security protocols. The difficulty with using either hash is that for a legacy protocol like IPv4 there is not enough room for all the bits of the hash in the packet header. Furthermore, these hashes were designed to protect large files of indeterminate size. Often their design and implementation is not suited for protocols that typically require very fast operation over packets with a known maximum size, such as 64 kilobytes for IPv4 packets.

SUMMARY OF THE INVENTION

A system and methods are disclosed which allow a Vernam stream cipher to be successfully used in a security system, in particular one that supports a secure computer network protocol. Supporting the cipher are methods for a non-cyclic pseudo-random number generator (PRNG) and a keyed one-way hash, or message authentication code (MAC) mechanism.

The invention provides methods for generating a stream of random bits from a PRNG. They generate these bits in such a manner as to not have any predictable random number sequence cycle and to have them all ultimately come from a true hardware random number generator (RNG). In effect these PRNGs act as performance amplifiers for a much slower hardware RNG, providing vast amounts of random bits for use in a Vernam cipher based cryptosystem. By randomly shuffling the private static source of random bits this provides a high level of system wide entropy.

Further, the invention provides a system and method for enciphering or deciphering bytes of data. The first layer of protection is to create a final pad from a private and secret derived source of random bits to encipher or decipher a data stream using simple XOR and rotation operations. The second layer of protection is to periodically deliver random cryptographic keys and values from a secured server to the local computer that control the random reshuffling of the private and secret local source of random bits, creating the derived source of random bits. The final layer of protection is to every so often replace the private and secret local source of random bits with a fresh set of random bits from a secured server. The secured server contains the previously described PRNG, which generates all the random bits needed to deliver keys and new secret random bits to the local computer. A large disk storage media, such as a CD ROM, could be substituted for the secured server to allow off line operation.

The invention provides a system and method for maintaining the integrity and providing authentication for a message. This method of a keyed one-way hash uses a tree construction that cascades the results of a set of compression functions into another smaller set until an intermediate value is formed. Each compression function utilizes a set of random vectors used to randomly rotate message bits to prevent a type of $2^{nd}$ pre-image attack and to make it non-deterministic to foil MAC forgery attacks. This intermediate value in turn is used to look up a random value, or hash value, from a set of tables, which prevent $1^{st}$ pre-image and certain $2^{nd}$ pre-image attacks. A one-time pad in turn encrypts the hash value, thus practically and theoretically eliminating any known-plain text attacks to determine any internal tables or source bits of the random vectors. For added security internal tables, random source bits for the vectors and the one-time pad are periodically refreshed from the security server. The secured server contains the previously described PRNG that generates all the random bits needed to deliver new look up tables, rotation vectors and one-time pad random bits to the local computer. A large disk storage media, such as a CD ROM, could be substituted for the secured server to allow off line operation.

BRIEF DESCRIPTION OF THE DRAWINGS

FIG. 3 depicts a diagram illustrating one embodiment of the random permutation according to the invention.

FIG. 4 depicts a diagram illustrating one embodiment of the random permutation according to the invention.

FIG. 5 depicts a diagram illustrating one embodiment of re-arranging a sequence of numbers randomly according to the invention.

FIG. 6 depicts a diagram illustrating the Key or Seed Data Structure according to the invention.

FIG. 7 depicts a diagram illustrating unit sizes according to the invention.

FIG. 8 depicts a flow diagram illustrating a process of random nested shuffling according the invention.

FIG. 9 depicts a diagram illustrating a random nested shuffle of a number sequence according to the invention.

FIG. 10 depicts a diagram illustrating a pseudo-random number generator according to the invention.

FIG. 11 depicts a diagram illustrating a data flow of generating a stream of pseudo-random numbers according to the invention.

FIG. 12 depicts a diagram illustrating a data flow of random shuffling a random source pool according to the invention.

FIG. 13 depicts a diagram illustrating a data flow between a sender, a receiver and server according to the invention.

DETAILED DESCRIPTION OF THE INVENTION

Specific reference is made in detail to the embodiments of the invention, examples of which are illustrated in the accompanying drawings and following descriptions. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

In the following descriptions the following descriptive names will be used; Key, Seed, Vector, Pad, Pool, Strip, Table, Value, Card, Pack, Case, random number generator (RNG), and pseudo random number generator (PRNG). A Seed is populated with random bits from a hardware RNG, and are generated and consumed within a centralized secured server or disk manufacturing utility. A Key, Pad, Value, Table, and Pool are populated with random bits from the PRNG. A Vector can be populated with random bits from either a RNG or a PRNG. A Pool is never used directly but supplies random bits for other things like Pads, Vectors, and Strips. A Strip is a sequence of bytes taken out of a Pool only once (known in the literature as a one-time pad). A Vector is a sequence of random numbers or bits used to control an operation on another sequence of random numbers. A random factorial permutation of a sequence of bytes or numbers will be referred to as a Shuffle.

Figure 1:
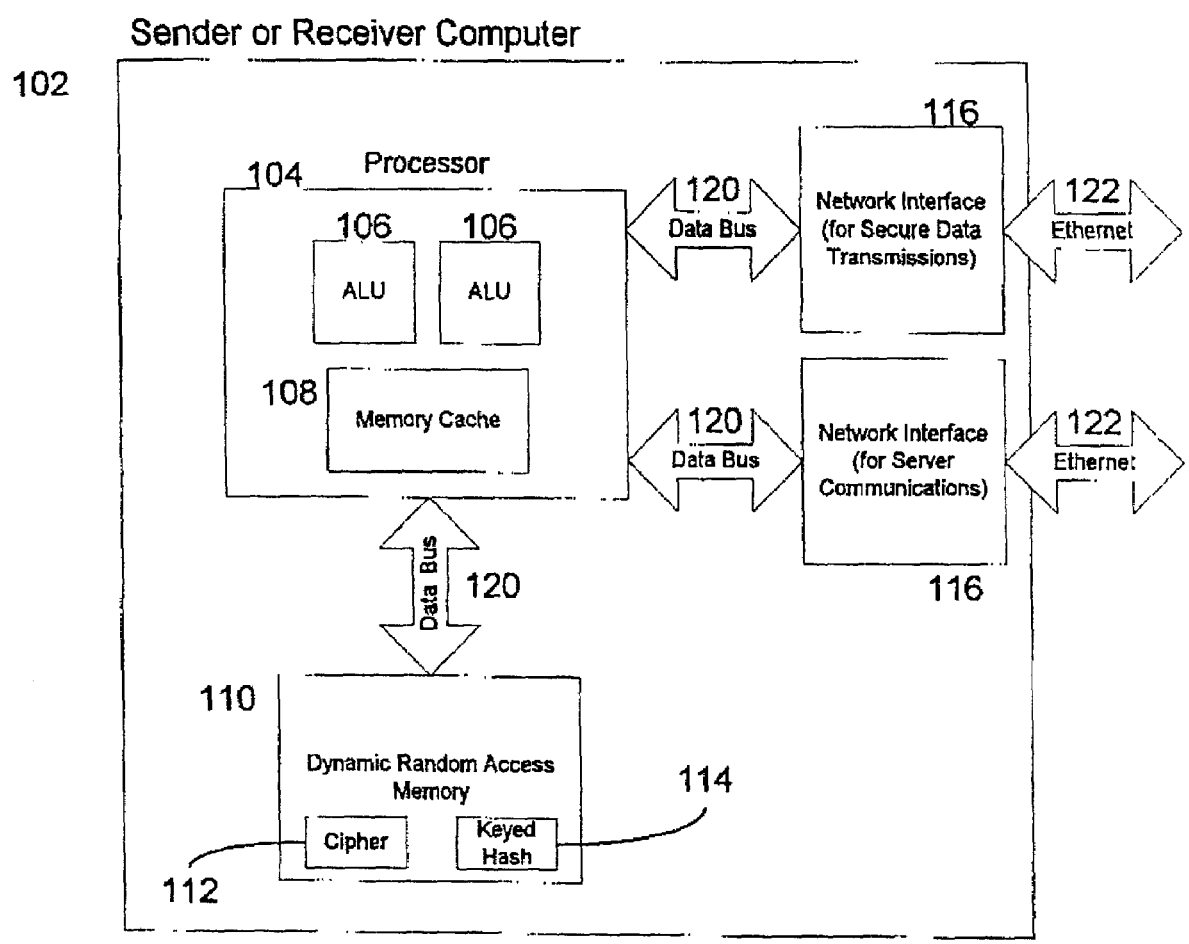
FIG. 1 depicts a diagram illustrating one embodiment of the of a sender or a receiver computer according to the invention.

Referring to FIG. 1, a Sender or Receiver Computer (102) contains a processor (104), a dynamic random access memory (DRAM) module (110) and one or more network interfaces (116), all interconnected internally by one or more data buses (120). The Network Interfaces (116) are also connected to a data link channel (122) such as Ethernet. Within the processor (104) are one or more arithmetic logic units (ALUs, 106) which can perform bit wise exclusive OR (XOR) or bit wise rotations of supported integers sizes, typically 1, 2, 4 or 8 bytes, and high speed on-chip memory cache (108). The DRAM contains the software of the Vernam Stream Cipher (112) and Keyed One-Way Hash (114).

Figure 2:
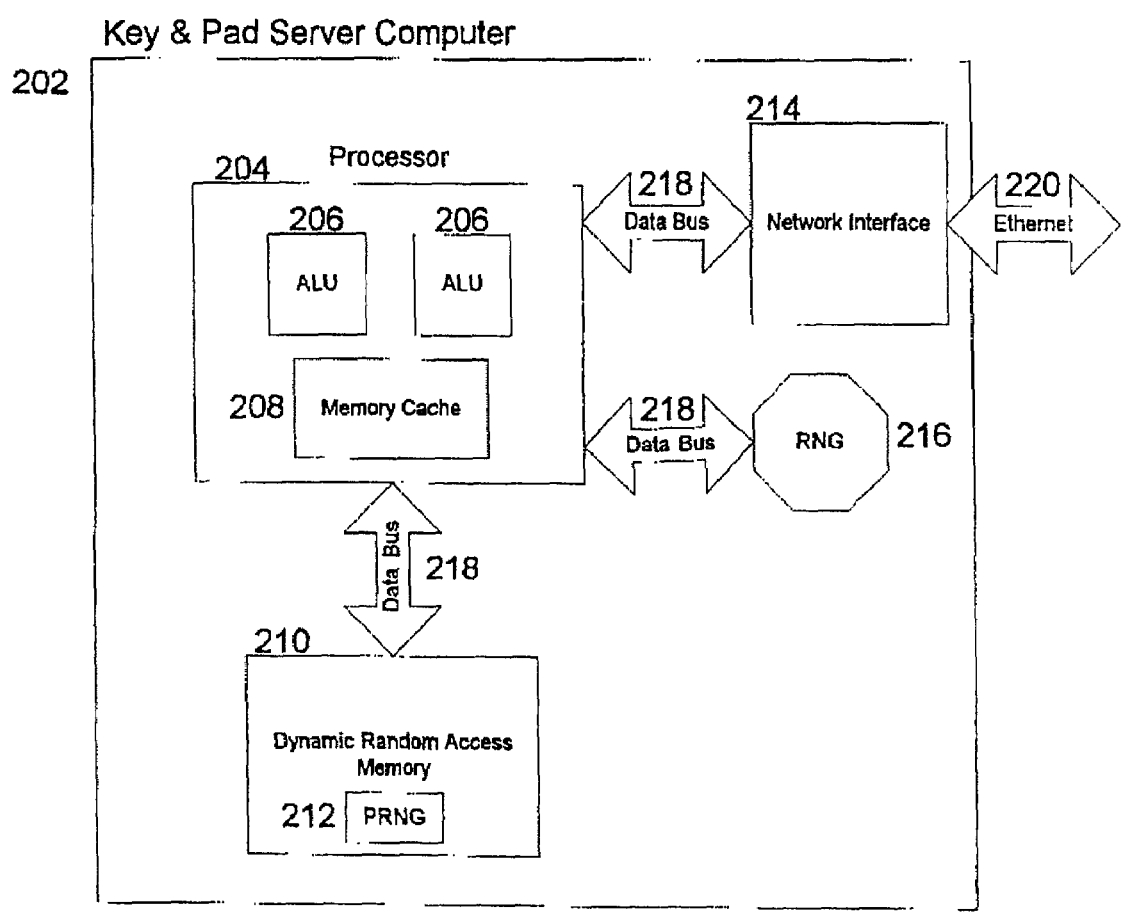
FIG. 2 depicts a diagram illustrating one embodiment of the of a server computer according to the invention.

Referring to FIG. 2, a Key & Pad Server Computer (202) contains a processor (204), a dynamic random access memory (DRAM) module (210), a network interface (214) and a hardware random number generator (RNG, 216), all interconnected internally by one or more data buses (218). The network interface (214) is also connected to a data link channel (220) such as Ethernet. Within the processor (204) are one or more arithmetic logic units (ALUs, 206), which can perform bit wise exclusive OR (XOR) or bit wise rotations of supported integers sizes, typically 1, 2, 4 or 8 bytes, and high speed on-chip memory cache (208). The DRAM contains the software of the PRNG (212).

Referring to FIG. 3, a simple mechanism of generating a random sequence of N unique numbers from the set of numbers 0 to N−1, where N is a power of 2, would be to take the output of a hardware RNG (302) and use its output of bits to fill in an array of N values (304). Each value is represented by $\log_2(N)$ bits. The first $\log_2(N)$ bits produced by the RNG would fill in the first value in the array. The $2^{nd}$ $\log_2(N)$ bits produced by the RNG would be used to fill in the $2^{nd}$ value in the array if they are different from the $1^{st}$ value. If not, then those bits are thrown away and another set of bits are acquired from the RNG and the procedure is repeated until a $2^{nd}$ value is found that is different from the $1^{st}$ value. The process is continued for the $3^{rd}$ through Nth values, where each value from the RNG is compared with all previous values and used to fill a position in the array only if it is different. In this way all possible numbers from 0 to N−1 are randomly selected and placed into the array.

Referring to FIG. 4, a near-perfect riffle shuffle mechanism of generating a random sequence of N unique numbers from the set of numbers 0 to N−1, where N is a power of 2, would be to take the output of a hardware RNG (402) and use its output of bits to create a Random Repeat Number (404) and a Random Control Vector (406) of N/2 bits. The Random Repeat Number, X, is not less than $\frac{3}{2} \times \log_2(N)$, for example if N equals 256 then X equals 12 or greater. If X is too small, then another number is retrieved from the RNG until this criteria is satisfied. Taking a sequence of numbers from 0 to N−1 (408), we then split it into two halves (410, 412) and riffle shuffle them together, similar to how a pack of cards would be shuffled, with the interleaving of the numbers being determined by the Random Control Vector (406). The vector indicates whether a number in an array slot from the upper half (410) should go before or after its corresponding number in the same array slot in the lower half (412). The result is then placed in a new array of numbers (414). This new array of numbers (414) then replaces the original array of numbers (408). This whole process (from 406 to 414) is repeated X times (404), until the original sequence of numbers (408) are thoroughly and randomly shuffled (414).

Referring to FIG. 5, using a random sequence of unique numbers (502), a control sequence, which come from a countable sequence of numbers starting at zero, and treating them as indices to a source array of random numbers (504), the invention indicates the new arrangement of a result sequence of the random numbers (506). For example, counting from 0, if the $0^{th}$ element in the control sequence is the number 2, then this means that the value of the $0^{th}$ element of the result sequence is the same as the value of the $2^{nd}$ element of the source sequence. If the $1^{st}$ element in the control sequence is the number 5, then this means that the value of the $1^{st}$ element of result sequence is the same as the value of the $5^{th}$ element of the source sequence. This is repeated for all N indices from 0 to N−1. This operation using the control sequence to convert the source sequence to the result sequence will be known as a random shuffle throughout the rest of this document.

Referring to FIG. 6, the random control sequence of unique numbers will be referred to as a Key or a Seed (602) throughout the remainder of this document. The difference between the two terms is that a Seed is generated directly from a hardware RNG while a Key is generated from a PRNG. Keys and Seeds come in sequences with an amount of numbers countable by powers of 2, $2^Y$ where Y is usually 6, 7, or 8. I.e. sequences of 64, 128 or 256 unique numbers randomly shuffled. The number of bits per number is Y. For example if Y is 7 then we have a sequence of $2^7$, or 128, unique numbers (randomly shuffled) with each number consisting of only 7 bits, i.e. only from the range of values 0 to 127.

Referring to FIG. 7, when large sequences of numbers are randomly shuffled, they are broken up into certain sizes. The smallest size is called a Card (702). This can consist of $2^U$ bytes, where U is 0, 1, 2, 3, or 4. I.e. a Card can be 1, 2, 4, 8 or 16 bytes in size. Usually a Card size is chosen for optimal arithmetic operation using common microprocessor architectures. The next larger size is a Pack (704), which consists of $2^V$ Cards, where V is 6, 7, 8 or larger. I.e. a Pack can consist of 64, 128, 256 or more Cards. The next larger size is a Case (706), which consists of $2^W$ Cards, where W is 6, 7, 8 or larger. I.e. a Case can consist of 64, 128, 256 or more Packs. The largest size is the large sequence of numbers to be shuffled, usually called a Pad or a Pool (708), which consists of $2^X$ Cases, where X is 6, 7, 8 or larger. I.e. a Pad or Pool can consist of 64, 128, 256 or more Cases.

A Non-Cyclic Pseudo-Random Number Generator

Because a Vernam stream cipher, described later, requires a tremendous amount of random material (bytes), it is critical to have a high throughput and high quality Pseudo-Random Number Generator available. Without it, it would be impossible to engineer a security system based around a Vernam stream cipher.

Referring to FIG. 8, a nested shuffling process is shown by the flow diagram. At block 802, the 3 Mixing Seeds are received. The 3 Mixing Seeds include Case Seeds, Pack Seeds, and Card Seeds. At block 804, a shuffling function is performed on each Case utilizing a Case Seed for each Case, this is a Level 1 shuffle (L1). At block 806, each of the shuffled Cases are divided into multiple Packs. At block 808, a shuffling function is performed on each Pack utilizing a Pack Seed for each Pack, this is a Level 2 shuffle (L2). At block 810, each of the shuffled Packs are divided into multiple Cards. At block 812, a shuffling function is performed on each Card utilizing a Card Seed for each Card, this is a Level 3 shuffle (L3).

Referring to FIG. 9, a nested shuffling of a sequence of Cards proceeds as follows. A sequence of cards (902) divided into Cases (904), which are then shuffled according to a Case Key or Seed (916), resulting in randomly permuted sequence of Cases (906). Then in turn, these shuffled Cases (906) are subdivided into Packs (908), each Case being partitioned identically, which are then shuffled according to a Pack Key or Seed (918) that is applied once per Case to each set of Packs contained therein, resulting in identically randomly permuted sequence of Packs per Case (910). Then in turn, these shuffled Packs (910) are subdivided into Cards (912), each Pack being partitioned identically, which are then shuffled according to a Card Key or Seed (920) that is applied once per Pack to each set of Cases contained therein, resulting in identically randomly permuted sequence of Cards per Pack (914).

Referring to FIG. 10, a RNG (1002), is used to periodically to create a couple of Random Source Pools A (1004) and B (1006). Using both Random Source Pools and input Mixing Seeds from the RNG, a PRNG (1008) emits a very large number of random numbers over a very short period of time. The PRNG is non-cyclic where finite sequences of random numbers have a very low probability of repeating in an unpredictable or random manner, until the next refresh of both Random Source Pools occurs.

Referring to FIG. 11, to initialize a PRNG, the RNG (1102) first fills a couple of Source Pools A (1104) and B (1106) with random numbers. The Source Pools (1104, 1106) are recommended to be at least 128 megabytes each, to ensure a very deep source of entropy for the PRNG. However, there is no absolute requirement for the Source Pools (1104, 1106) to be this large, except to ensure that any Keys, Pads or Pools (1128) that result from the PRNG and used within a large security system will have an extremely miniscule probability of being duplicated. The Source Pool A (1104) is nested shuffled (1112) using three Mixing Seeds A (1108), resulting in a Shuffled Source Pool A (1116). The Source Pool B (1106) is nested shuffled (1114) using three Mixing Seeds B (1110), resulting in a Shuffled Source Pool B (1120). These seeds come directly from the RNG (1102). The Shuffled Source Pool A is then used to XOR (1118) with the Shuffled Source Pool B (1120), byte by byte, resulting in a Source Pool (1122). When a sequence of random numbers is needed from the PRNG a Strip (1124) is copied from the Source Pool (1122). This Strip (1124) is not reused again. When the Source Pool (1122) is exhausted and a Strip (1124) cannot be retrieved from it, without being a duplicate of an older Strip, then two sets of 3 new Mixing Seeds (1108, 1110) are generated from the RNG (1102) and used to reshuffle the Source Pools (1104, 1106) to then create a new pair of Shuffled Source Pools (1116, 1120), which are combined together by XOR operations (1118) into a new Source Pool. The series of Strips taken from the Source Pool (1122) constitutes a PRNG stream of random numbers or bytes (1126) used to create Keys, Pads and Pools (1128). An old Strip can never be reused. Periodically the two Source Pools A and B (1104, 1106) are refreshed from the RNG (1102) to maintain their secrecy.

Referring to FIG. 12, the operation to nested shuffle a Source Pool A or B utilizes three Mixing Seeds; a Case Seed (1202), a Pack Seed (1204) and a Card Seed (1206), each having 512 unique random numbers. The Source Pool is partitioned into 512 Cases (1208). The Cases (1208) are all shuffled together randomly (1210), using the Case Seed (1202) to determine the shuffle pattern, and results in a random sequence of Cases (1212). Each Case is further partitioned into 512 Packs (1214). The Packs (1214) within each Case are shuffled together randomly (1216), using the Pack Seed (1204) to determine the shuffle pattern, and results in a random sequence of Packs (1218), identically shuffled per Case. Each Pack within each Case is further partitioned into 512 Cards (1120) of one byte each. The Cards (1120) within each Pack are shuffled together randomly (1222), using the Card Seed (1206) to determine the shuffle pattern, and results in a random sequence of Cards (1224), identically shuffled per Pack. These three levels of shuffling, Level 1 (L1), Level 2 (L2) and Level 3 (L3), result in a randomly shuffled Source Pool, which has $(2^{1171})^3$ or $2^{3513}$ random permutations, i.e. entropy of 3315 bits.

A Vernam Stream Cipher

The idea behind this embodiment of the Vernam Stream cipher is that its work factor strength and its high processor efficiency comes from its bipartite structure: one part being a set of nested shuffles and substitution translations of the Source Pads, the other being an operation creating a Final Pad with two simple rotations and shuffles.

Note that random material, be it Pads or Keys, ultimately comes from the Server. In one embodiment, the Server is absolutely physically secured, with a very high quality, fast PRNG inside it that is fed bits by a high quality RNG.

The most expensive and time consuming processor operations are being amortized over time by refreshing the Source Pads periodically at a low frequency and then shuffling the Source Pads at a higher frequency using the Mixing Keys.

The Substitution Tables are needed when the Source Pads are shared among a group of computers, e.g. a fully meshed set of optical switches. For example, if there are 1024 switches sharing the same Source Pads, then each switch needs 1023 tables for each communicating channel. If a table is 256 bytes in size then this is a total of 261888 bytes, or approximately ¼ megabyte of tables that must be distributed to each machine. Even though all the switches know the Source Pads, they cannot easily discover the Substitution table used by other pairs of communicating switches. Caution needs to be excercised, by ensuring that the Source Pads are not made fully public across an entire network. Different Source Pads must be used for different sections of a network that need this type of communication, be it an Ethernet segment, a wireless LAN segment, server communicating to multiple client computers, or a fully connected set of computers. In this way if a set of Source Pads are discovered by an attacker only that section of the network is compromised.

The creation and use of the Final Pad on-the-fly from the Working Pads A & B is meant to be extremely processor efficient and stored within the on-chip cache of the processor. The creation of the Final Pad is much more frequent than the shuffling of the Source Pads by the Mixing Keys. If possible the Final Pad could even be pre-computed to handle very high bursts of data traffic (matching the highest network transmission speeds possible), for example handling an 8 MB burst before requiring a fresh Final Pad. A series of Final Pads could also be pre-computed to handle a long burst of data traffic, for example handling a 64 MB burst with 8 pre-computed Final Pads, each one's 8 MB unique with a very high probability. A Working Pad is paired with two Working Keys. There are never any random bits shared from one pair of Working Keys to the next pair of Working Keys.

The whole cipher has a layered design to thwart attacks on the internal secrets and yet allow it to be extremely efficient during encipherment. A Shuffled Source Pad is designed to allow the generation of a series of Working Pads before it needs to be reshuffled. The XORing of the two Working Pads together prevents a simple known plaintext attack on the $1^{st}$ Card to discover the Card shuffle pattern of the Working Pad (this assumes the Shuffled Source Pad has been compromised and is known). Even if the Shuffled Source Pad is compromised, the attacker then tries to get to the original Source Pad through three layers of shuffling. Even if the Source Pad itself is compromised at some point, that Source Pad is thrown away and a whole new Source Pad is downloaded from the Server. The random rotation of the Working Pads discourages certain counting and partial key attacks. The cipher is designed such that if attacks are possible with keys of 128 unique random numbers, then increase the keys to 256 unique random numbers. Any partial key attacks are made more difficult through use of the partioning of the Source Pads and operating on them separately under random guidance until the last possible moment before creating the Final Pad.

Through software implementation, the cipher does not require burning in new firmware nor redesigning an ASIC chip set. Another embodiment would be to add more memory chips.

Referring to FIG. 13, the Vernam cipher depends upon access to a reliable, moderately fast network for key and pad material distribution. It is designed with a 10 Mbps Ethernet LAN in mind for the back channel communications with a central Key and Pad Server (1302), which contains a RNG and a PRNG. The cipher itself will support over 1 Gbps encrypted throughput (1308) on an ordinary computer's communication interface, typically either 100 Mbps or 1 Gbps Ethernet, between the two computers, a Sender Computer (1304) and a Receiver Computer (1306). Each of these computers shares the identical sets of Working Keys (1316), Rotation Values (1318), Substitution Keys (1314), Mixing Keys (1312), and Source Pads (1310), and a copy of the cipher algorithm (1320) either in software or hardware. The Source Pads (1310) and Substitution Keys (1316) are periodically refreshed on both computers to maintain the maximum level of security. To extend the life (i.e. keep them secret longer) of the Source Pads, while they are on both computers, the server will send out Mixing Keys (1312) and Substitution Keys (1314) as needed. More frequently, Rotation Values (1318) and Working Keys (1316) are sent out to each machine to regenerate the actual randomly created pad used to encrypt the clear data or decrypt the cipher data (1308). Note that for purposes of this document all communications with the Key & Pad Server are considered secure, i.e. cryptographically mutually authenticated and private. This could also be achieved by having a separate physically secure 10 Mbps LAN dedicated to only distributing Keys, Values and Pads from the Server.

Figure 14:
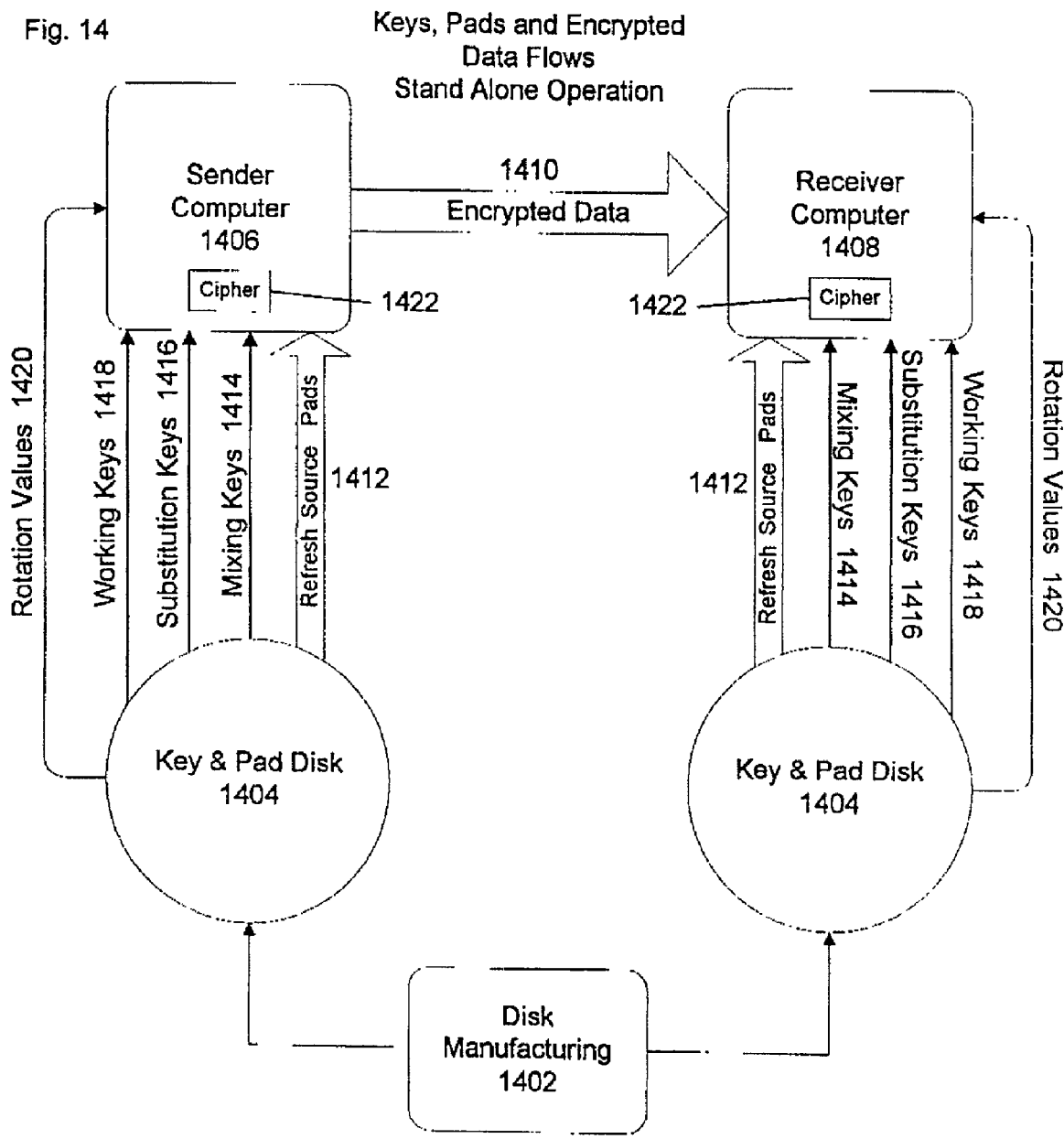
FIG. 14 depicts a diagram illustrating a data flow between a sender, a receiver and storage disk according to the invention.

Referring to FIG. 14, another embodiment for stand-alone operation without a server uses two identical disks (1404) that are generated from a Disk Manufacturing utility (1402), which contains a RNG and a PRNG. The cipher supports over 1 Gbps encrypted throughput (1410) on an ordinary computer's communication interface between the two computers, a Sender Computer (1406) and a Receiver Computer (1408). Each of these computers shares the identical sets of Working Keys (1418), Rotation Values (1420), Substitution Keys (1416), Mixing Keys (1414), Source Pads (1412), and a copy of the cipher algorithm (1422) either in software or hardware. The Source Pads (1412) and Substitution Keys (1416) are periodically refreshed on both computers to maintain the maximum level of security. To extend the life (i.e. keep them secret longer) of the Source Pads, while they are on both computers, they can retrieve Mixing Keys (1414) and Substitution Keys (1416) as needed from their respective disks (1404). More frequently, Rotation Values and Working Keys are retrieved by each machine to regenerate the actual randomly created pad used to encrypt the clear data or decrypt the cipher data (1410). Note that for purposes of this document all communications with the disks are considered secure, e.g. located inside each computer.

Figure 15:
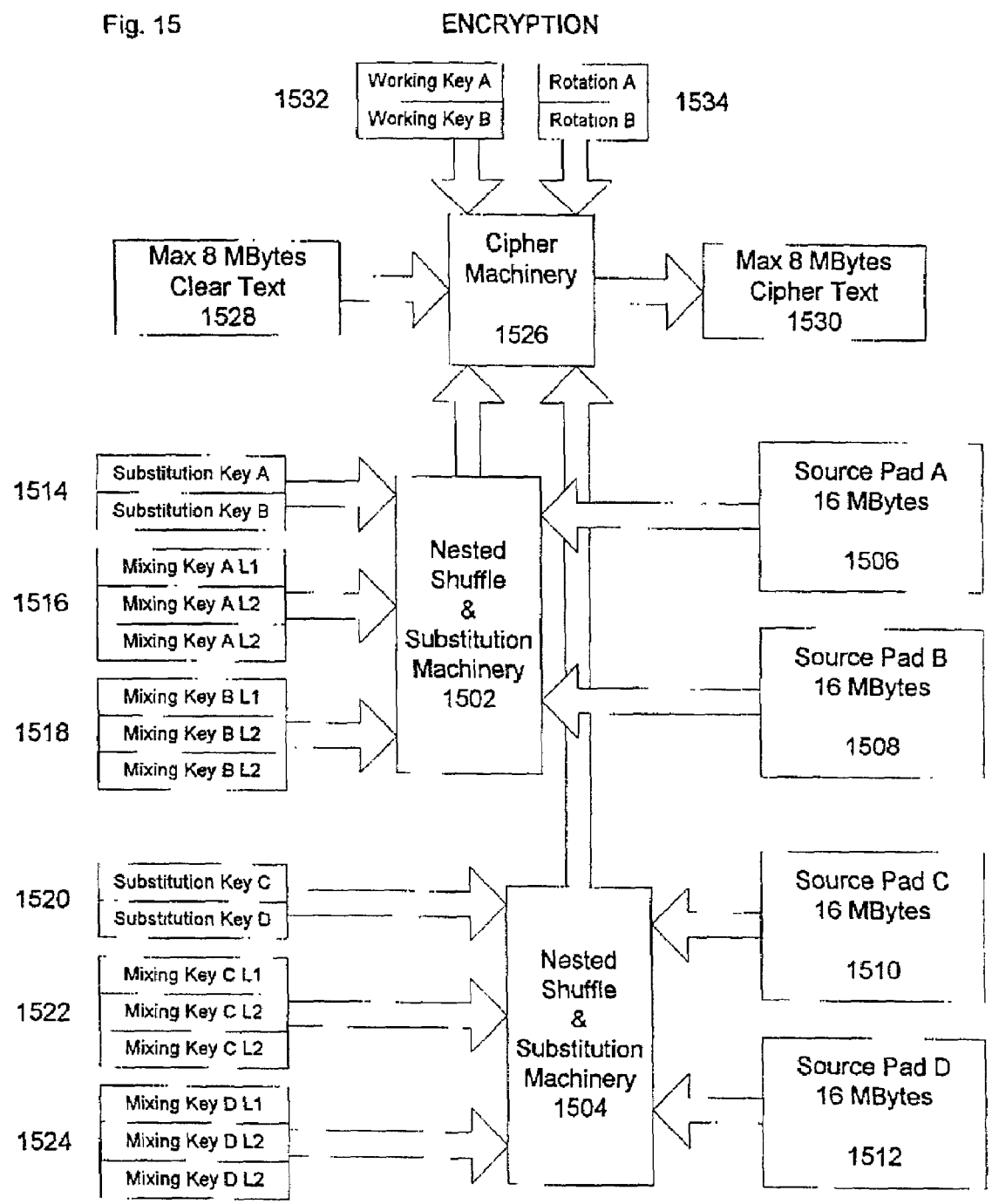
FIG. 15 depicts a diagram illustrating encryption according to the invention.

Referring to FIG. 15, for encryption the Cipher machinery (1526) takes as input two Working Pads, derived from the four Source Pads (1506,1508, 1510, 1512), two Working Keys (1532), two Rotation Values (1534), and the Clear Text data (1528). The two Working Pads each comes from one of the two Nested Shuffle & Substitution Machineries (1502,1504). One machinery (1502) takes as input two Source Pads A and B (1506,1508), two Substitution Keys A and B (1514), and two sets of three Mixing Keys (1516, 1518). The other machinery (1504) takes as input two Source Pads C and D (1510,1512), two Substitution Keys C and D (1520), and, two sets of three Mixing Keys (1522, 1524). The Clear Text data (1528) cannot exceed half the length of a Source Pad, before requiring a new set of Working Keys and Rotation Values. For example, using four 16 MB Source Pads, a maximum of 8 MB of data can be encrypted before requiring a fresh set of two Working Keys and two Rotation Values. So every 8 MB block of encrypted data has a pair of Working Keys and a pair of Rotation Values associated with it. Every byte of Clear Text data is transformed out into a corresponding byte of Cipher Text data (1530), in a manner very similar to standard stream cipher behavior. The $1^{st}$ clear byte, becomes the $1^{st}$ cipher byte, and the $2^{nd}$ clear byte becomes the $2^{nd}$ cipher byte, and so forth, until the last clear byte becomes the last cipher byte. However, unlike a normal stream cipher the bytes can be encrypted out of order, but regardless of order the $n^{th}$ clear byte always becomes the $n^{th}$ cipher byte.

Note that one of the properties of this Cipher is the ability to do "random access" encryption. For example to encipher the $5^{th}$ 8 MB block of data then simply get the $5^{th}$ pair of Working Keys and operate on it. Given an offset of a particular byte within the block then just encrypt that byte. The block can be smaller than 8 MB and then encrypt that smaller amount. The cipher machinery does not require any padding bytes to fill out a minimum block size like DES requires.

Note that another one of the properties of this Cipher is the ability to do "broadcast" encryption. For example several hosts can share the four Source Pads. During normal communications each pair of communication hosts will have a unique pair of Substitution Keys for each channel between a pair of hosts. However if one host broadcasts to the other hosts, then for the broadcast all receiving hosts can use the same Substitution Keys. This works in a similar same way for a fully meshed networking fabric of routers or switches.

Figure 16:
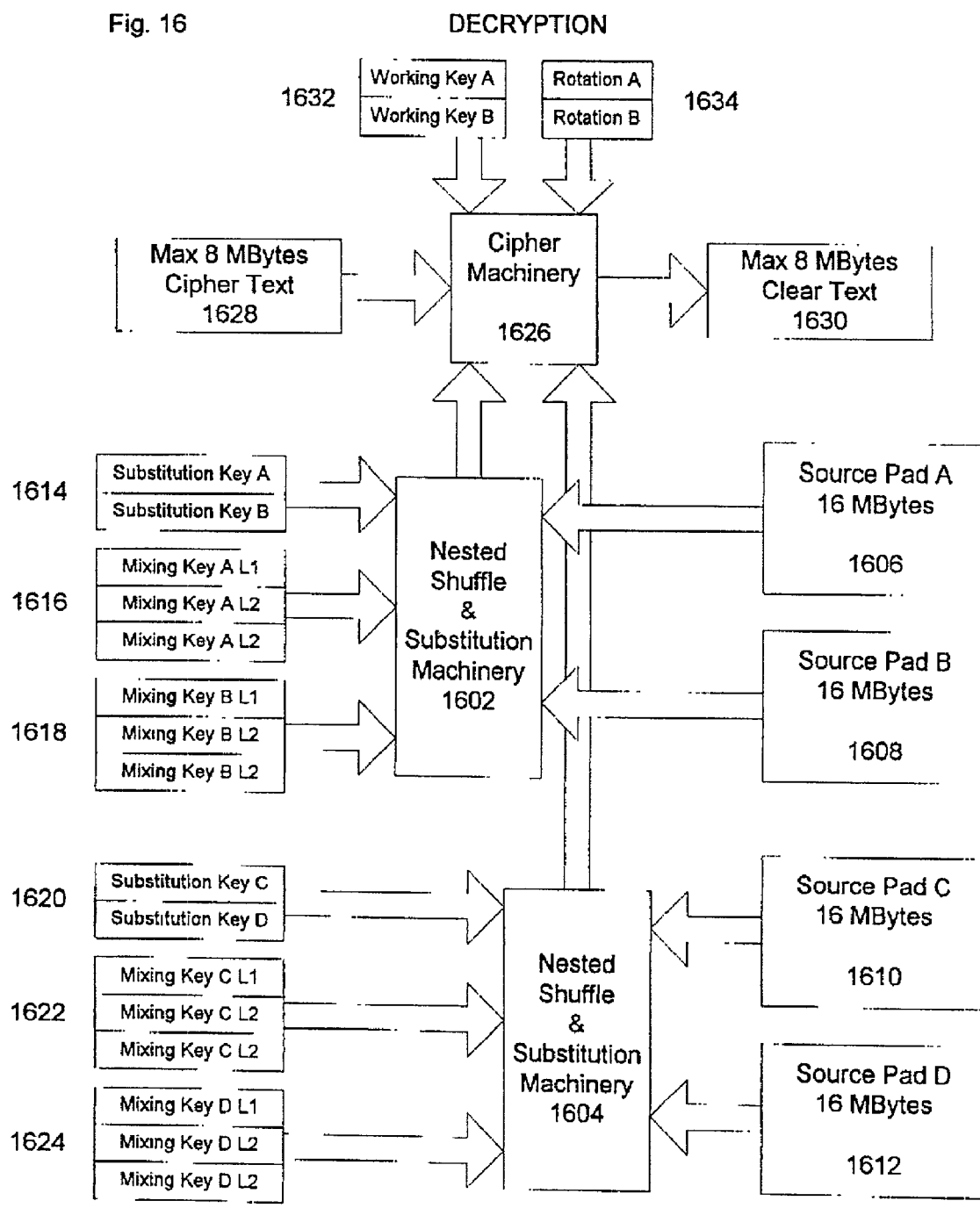
FIG. 16 depicts a diagram illustrating decryption according to the invention.

Referring to FIG. 16, decryption is identical to encryption, except that now the Cipher Machinery (1626) takes as input two Working Pads, derived from the four Source Pads (1606, 1608, 1610,1612), two Working Keys (1632), two Rotation Values (1634), and the Cipher Text data (1628). The two Working Pads each comes from one of the two Nested Shuffle & Substitution Machineries (1602,1604). One machinery (1602) takes as input two Source Pads A and B (1606, 1608), two Substitution Keys A and B (1614), and two sets of three Mixing Keys (1616,1618). The other machinery (1604) takes as input two Source Pads C and D (1610, 1612), two Substitution Keys C and D (1620), and two sets of three Mixing Keys (1622, 1624). The Cipher Text data (1628) cannot exceed half the length of a Source Pad, before requiring a new set of Working Keys (1632) and Rotation Values (1634). For example, using four 16 MB Source Pads, a maximum of 8 MB of data can be encrypted before requiring a fresh set of two Working Keys and two Rotation Values. Every byte of Cipher Text data is transformed out into a corresponding byte of Clear Text data (1630), in a manner similar to normal stream cipher behavior.

Figure 17:
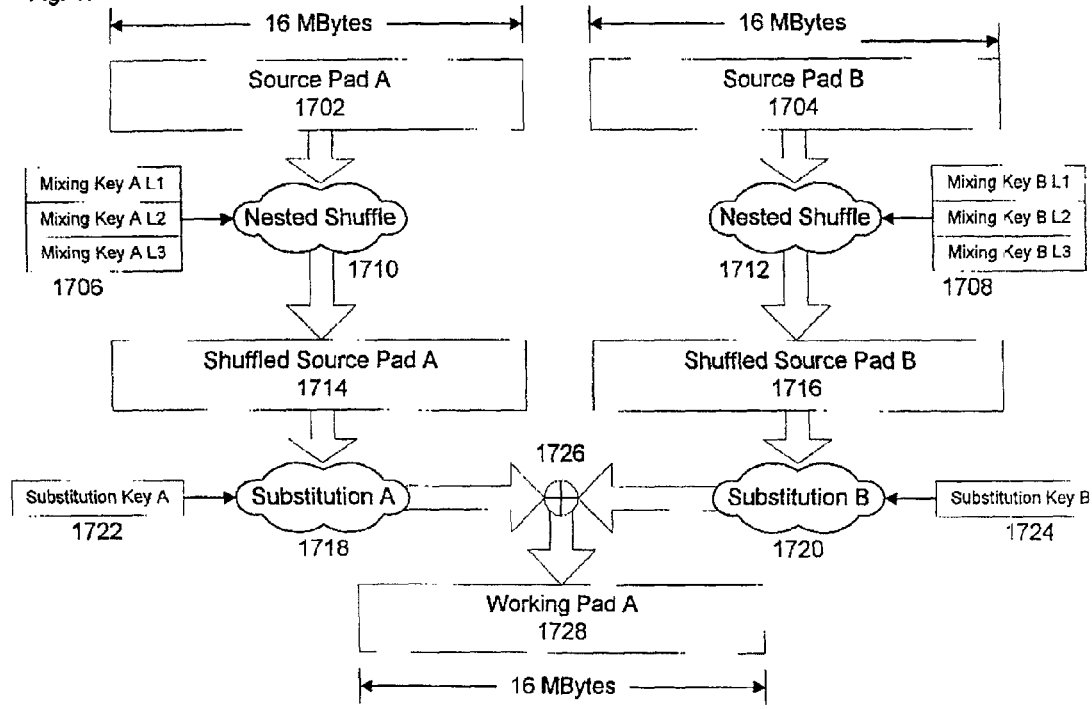
FIG. 17 depicts a flow diagram illustrating a half of the first part of the cipher according to the invention.

FIG. 17 reveals an internal view of a half of an initial phase of the Cipher Machinery. The Source Pad A of 16 megabytes (1702) is nested shuffled (1710) with the three Mixing Keys A (1706) resulting in a Shuffled Source Pad A of 16 megabytes (1714). Each byte of this is then randomly substituted for another byte using Substitution Table A (1718), which takes as input Substitution Key A (1722). The Source Pad B of 16 megabytes (1704) is nested shuffled (1712) with the three Mixing Keys B (1708) resulting in a Shuffled Source Pad B of 16 megabytes (1716). Each byte of this is then randomly substituted for another byte using Substitution Table B (1720), which takes as input Substitution Key B (1724). XOR the two resulting pads from Substitution Tables A and B together (1726), byte-by-byte, and the result is a 16-megabyte Working Pad A (1728).

Figure 18:
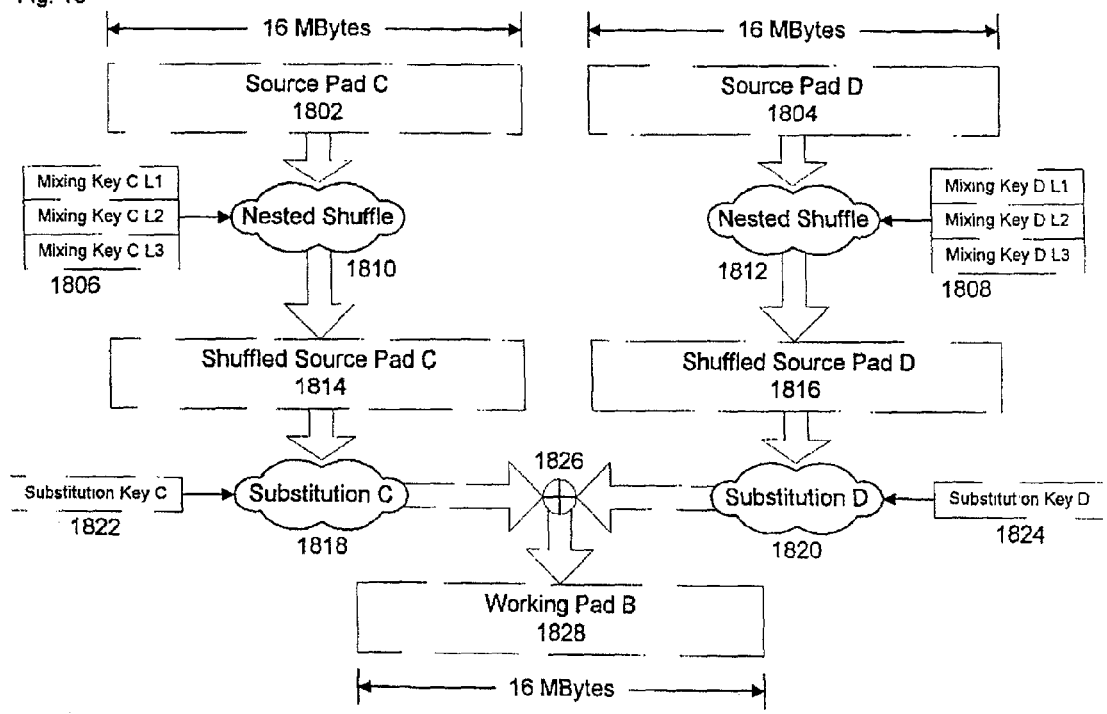
FIG. 18 depicts a flow diagram illustrating another half of the first part of the cipher according to the invention.

FIG. 18 reveals an internal view of another half of the initial phase of the Cipher Machinery. The Source Pad C of 16 megabytes (1802) is nested shuffled (1810) with the three Mixing Keys C (1806) resulting in a Shuffled Source Pad C of 16 megabytes (1814). Each byte of this is then randomly substituted for another byte using Substitution Table C (1818), which takes as input Substitution Key C (1822). The Source Pad D of 16 megabytes (1804) is nested shuffled (1812) with the three Mixing Keys D (1808) resulting in a Shuffled Source Pad D of 16 megabytes (1816). Each byte of this is then randomly substituted for another byte using Substitution Table D (1820), which takes as input Substitution Key D (1824). XOR the two resulting pads from Substitution Tables D and C together (1826), byteby-byte, and the result is a 16-megabyte Working Pad B (1828).

Figure 19:
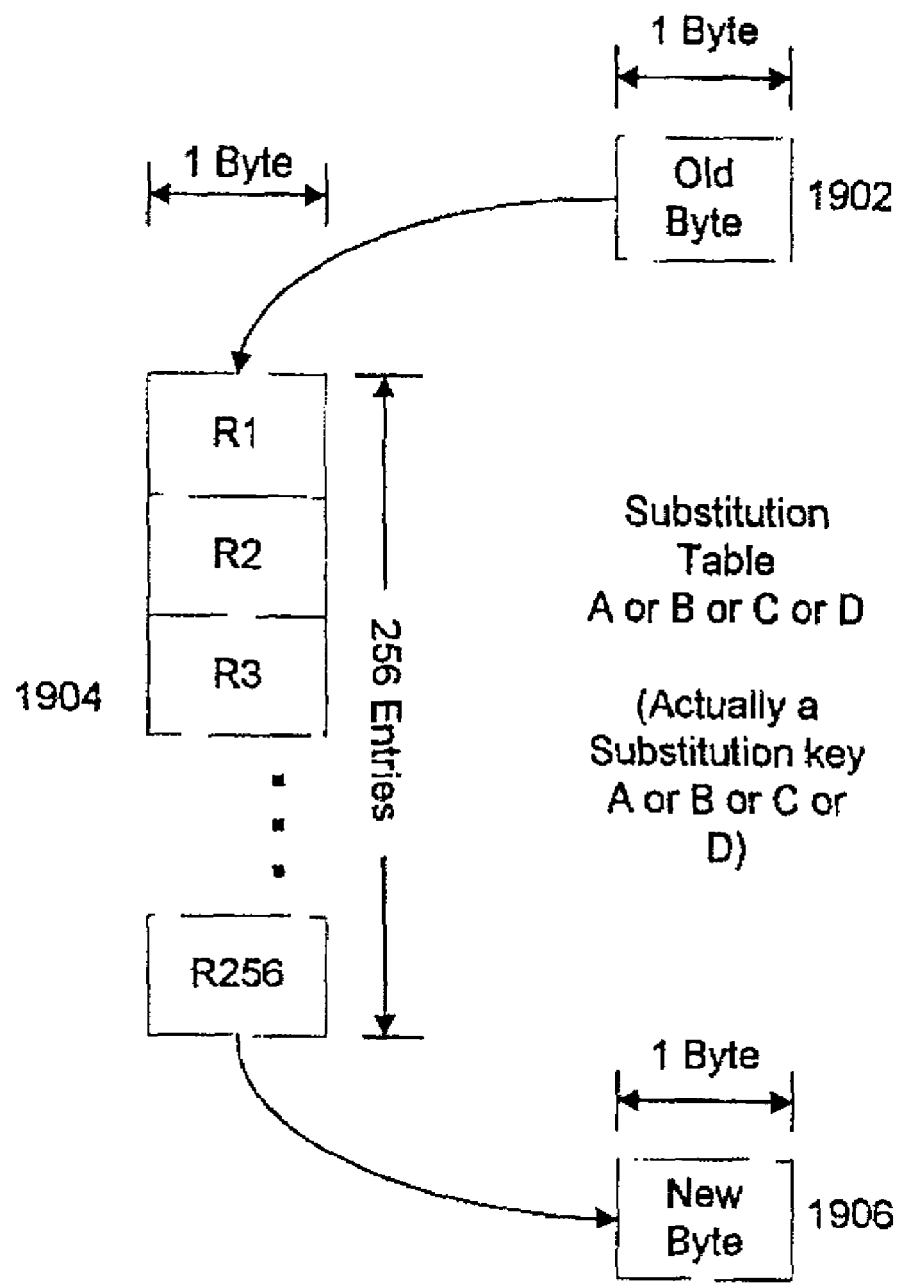
FIG. 19 depicts a flow diagram illustrating a substitution table according to the invention.

FIG. 19 reveals an internal view of the mechanics of a Substitution Table. Each byte of a Shuffled Source Pad (1902) is used as an index into a byte of a Substitution Key, which is also known as the Substitution Table (1904). The indexed byte or new byte (1906) is then substituted for the old byte (1902). This is repeated for each byte of the Shuffled Source Pad.

Figure 20:
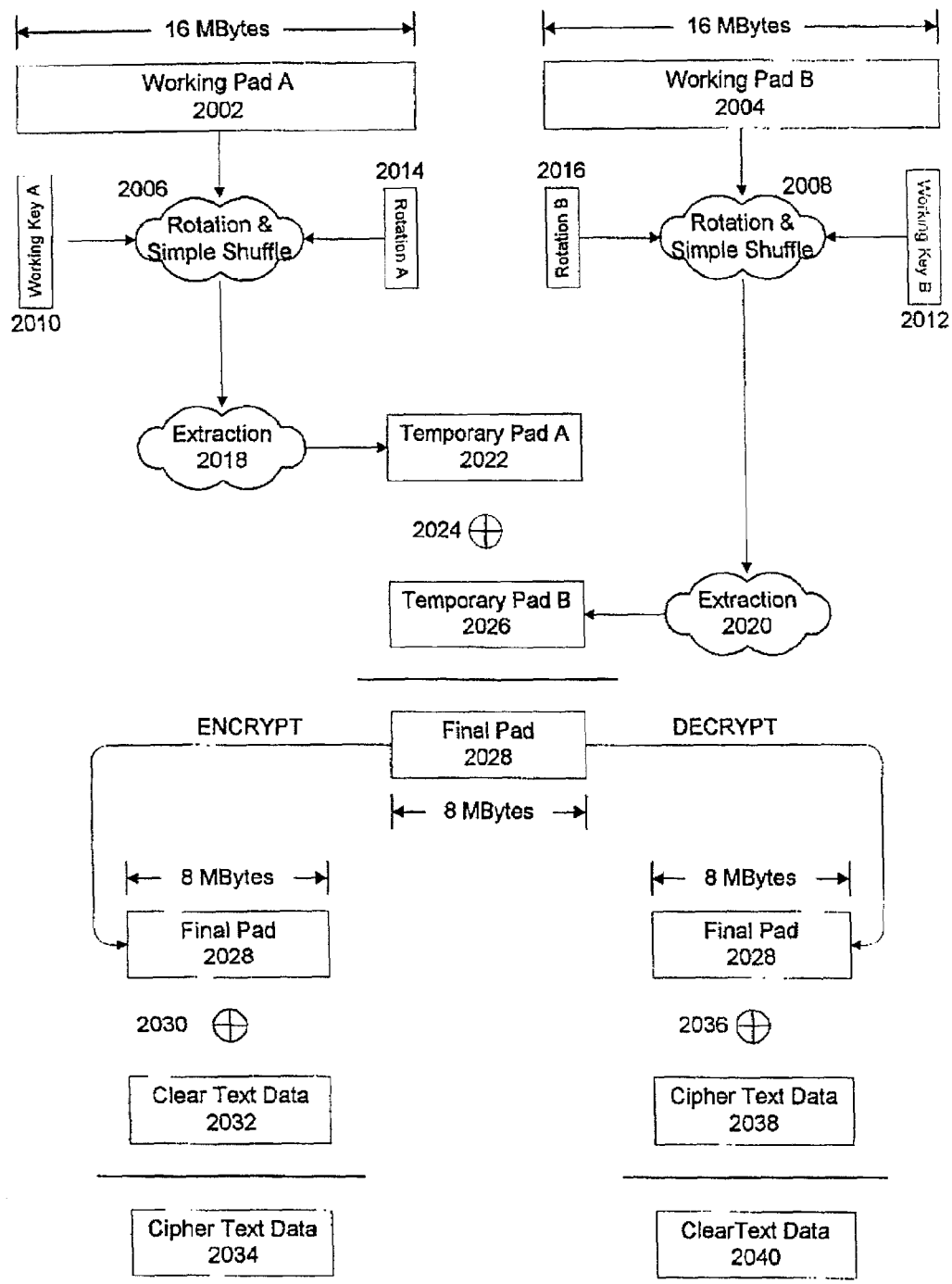
FIG. 20 depicts a flow diagram illustrating the second and final part of the cipher according to the invention.

FIG. 20 reveals an internal view of a final phase of the Cipher Machinery. The Working Pad A (2002) is Rotated and then Simple Shuffled (2006), using a Working Key A (2010) and a Rotation Value A (2014), then extract half of each of the Cards (2018), and the result is a 8-megabyte Temporary Pad A (2022). The Working Pad B (2004) is Rotated and then Simple Shuffled (2008), using a Working Key B (2012) and a Rotation Value B (2016), then extract half of each of the Cards (2020), and the result is a 8-megabyte Temporary Pad B (2026). XOR the two resulting Temporary Pads (2022, 2026) together (2024), byte-by-byte, and the result is a 8-megabyte Final Pad (2028). This Final Pad can then be used to XOR (2030) with Clear Text Data (2032), byte by byte, resulting in Cipher Text Data (2034), or it can be used to XOR (2036) with Cipher Text Data (2038), byte by byte, resulting in Clear Text Data (2040).

Figure 21:
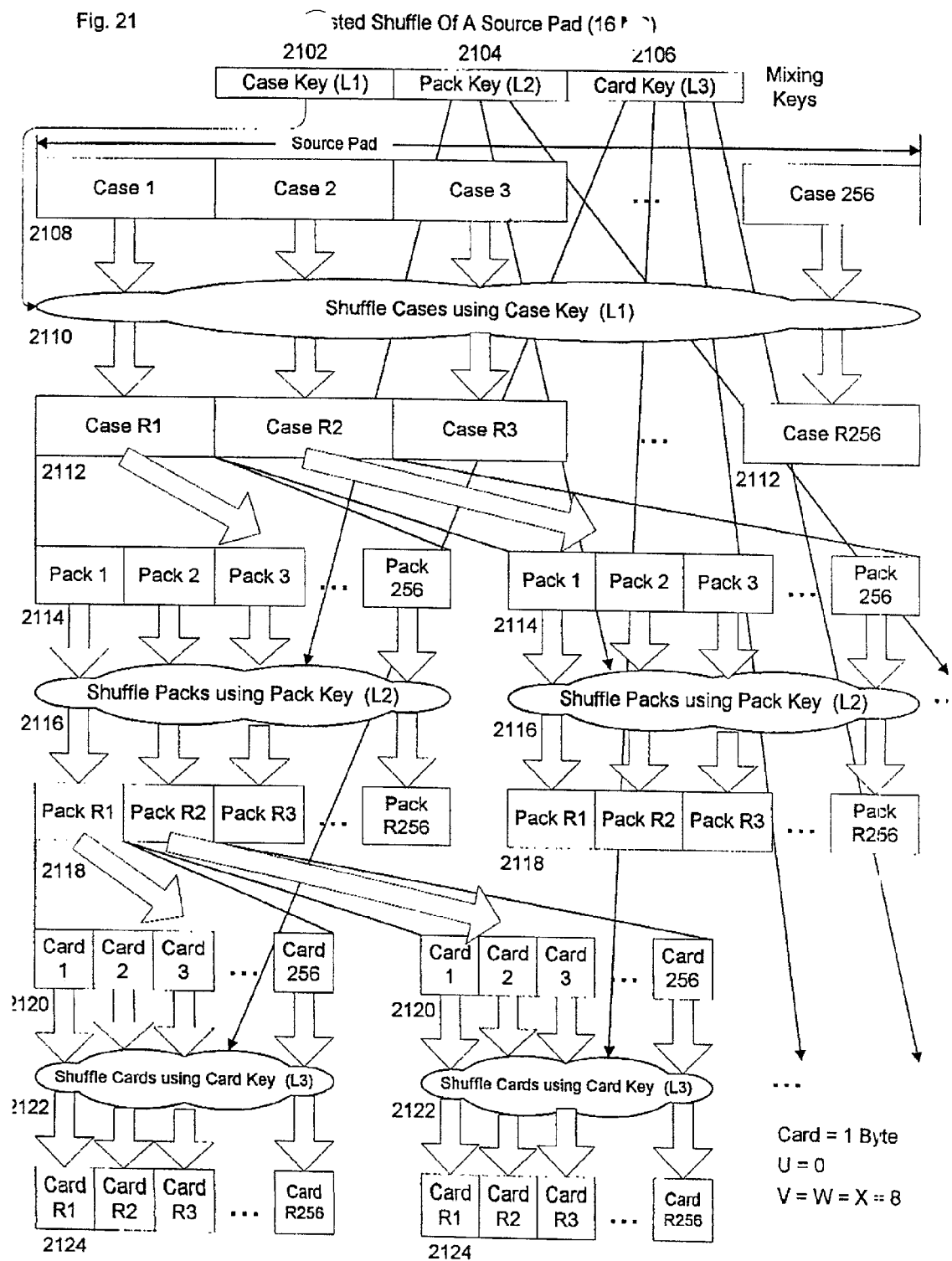
FIG. 21 depicts a diagram illustrating a data flow of random nested shuffling a source pad according to the invention.

Referring to FIG. 21, the operation to nested shuffle a Source Pad A or B or C or D of 16 megabytes each utilizes three Mixing Seeds; a Case Seed (2102), a Pack Seed (2104) and a Card Seed (2106), each having 256 unique random numbers. The Source Pad is partitioned into 256 Cases (2108). The Cases (2108) are all shuffled together randomly (2110), using the Case Seed (2102) to determine the shuffle pattern, and results in a random sequence of Cases (2112). Each Case is further partitioned into 256 Packs (2114). The Packs (2114) within each Case are shuffled together randomly (2116), using the Pack Seed (2104) to determine the shuffle pattern, and results in a random sequence of Packs (2118), identically shuffled per Case. Each Pack within each Case is further partitioned into 256 Cards (2120) of one byte each. The Cards (2120) within each Pack are shuffled together randomly (2122), using the Card Seed (2106) to determine the shuffle pattern, and results in a random sequence of Cards (2124), identically shuffled per Pack. These three levels of shuffling, Level 1 (L1), Level 2 (L2) and Level 3 (L3), result in a randomly shuffled Source Pad, which has $(2^{512})^3$ or $2^{1536}$ random permutations, i.e. entropy of 1536 bits.

Figure 22:
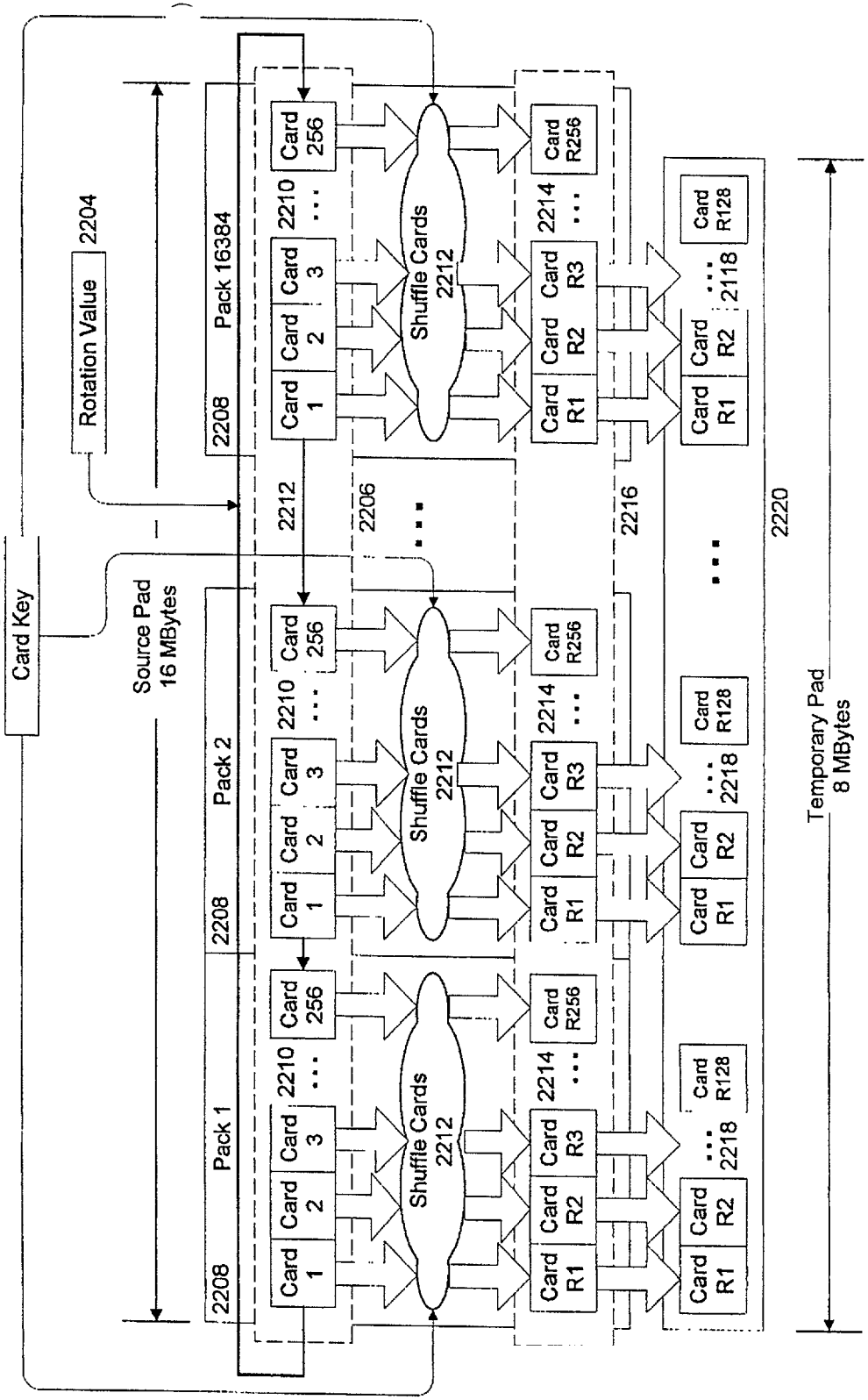
FIG. 22 depicts a diagram illustrating a data flow of random rotation and random shuffling a preliminary pad to create via extraction a final enciphering pad according to the invention.

Referring to FIG. 22, this illustrates the core operation of the cipher. First a Working Pad of 16-megabytes (2206) is randomly rotated by 4-byte intervals using the random Rotation Value (2204). Then the Working Pad is sub-divided into 16384 Packs (2208) of which each is further sub-divided into 256 Cards (2210) where a Card is 4 bytes in size. Using the Working Key (2202) we shuffle the Cards in the $1^{st}$ Pack (2212). This results in 256 randomly shuffled Cards in the first Pack (2214). We repeat this from $2^{nd}$ to the last Pack in the Working Pad. This results in a 16-megabyte Rotated and Shuffled Working Pad (2216). Finally we extract the first 128 Cards of each Pack (2218) and assemble them into an 8-megabyte Temporary Pad (2220).

This shuffle can be done extremely fast since a typical Working Key and many Source Pad Packs can be brought in the microprocessor's fastest L1 cache. The Key stays in L1 cache, amortizing its load cost from DRAM over all the 16384 Packs. Further performance gains can be made by taking advantage of multiple ALU pipelines in a CPU to process either larger Cards or multiple Packs simultaneously.

The Source Pads are considered to be secret, known only to the Sender, the Receiver, and the Key & Pad Server. The only exception is for supporting host broadcasting, when they are shared across all the hosts. The three levels of four sets of Mixing Keys, two sets of Substitution Keys, along with the four Source Pads, which themselves are periodically changed, interact to effectively keep the four Source Pads secret for as long as possible. In the exceptional case of broadcast support, where the Source Pads are known, then the Substitution table should prevent an offline precomputation attack.

A Keyed One-Way Hash

Figure 23:
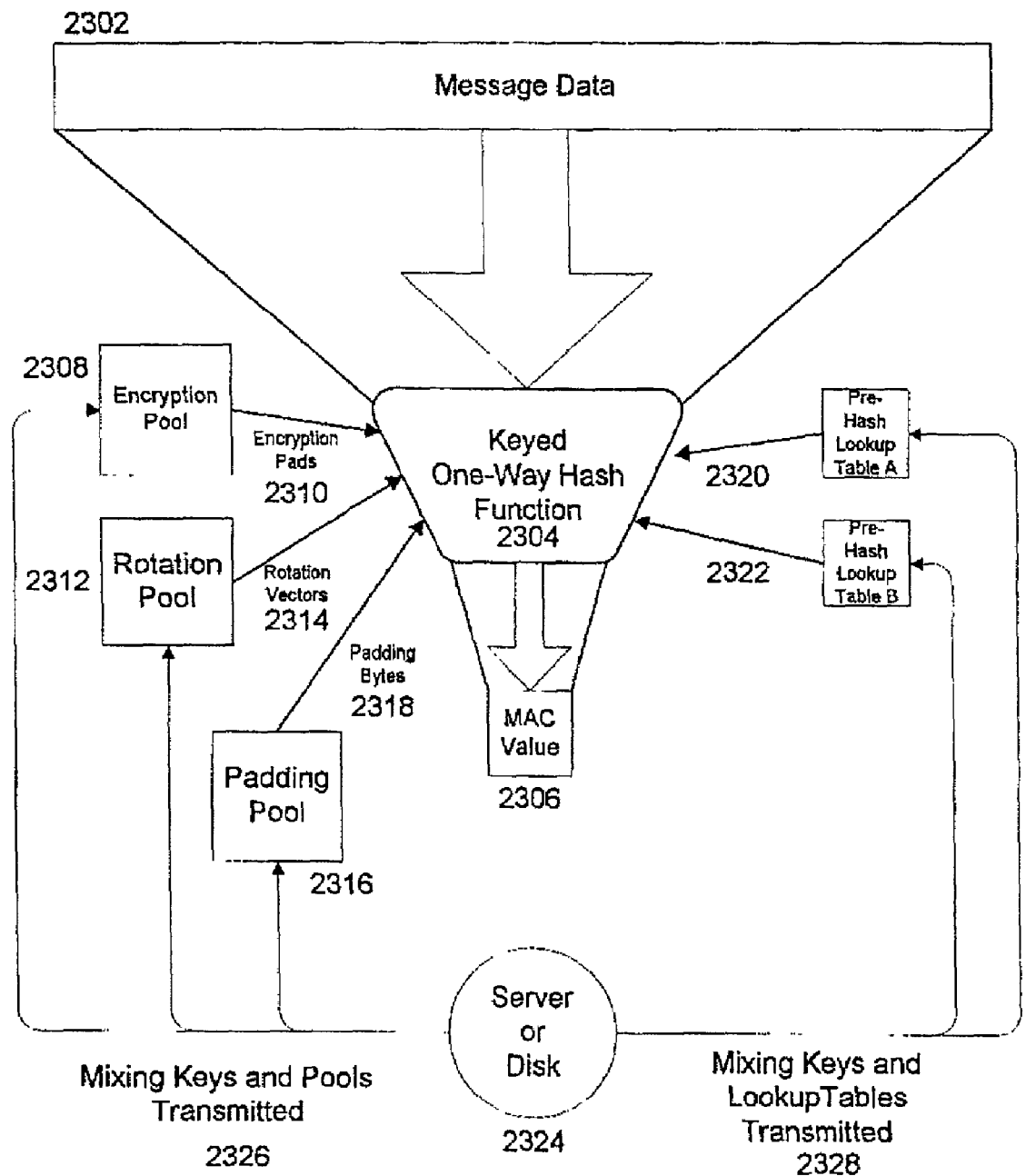
FIG. 23 depicts a diagram illustrating a data flow of a keyed one-way hash function according to the invention.

Referring to FIG. 23, a Keyed One-Way Hash function (2304) takes as input a Data Buffer (2302), Encryption Pads (2310) from an Encryption Pool (2308), Rotation Vectors (2314) from a Rotation Pool (2312), Padding bytes (2318) from a Padding Pool (2316), and Pre-Hash Lookup Table A (2320) and Pre-Hash Lookup Table B (2322). It outputs a Message Authentication Code or MAC Value (2306). All pools and tables come from a central Server or a Disk (2324). Mixing Keys for nested reshuffling all the pools and pool refreshes come from the Server or the Disk (2326). Mixing Keys for nested reshuffling the tables, and tables refresh come from the Server or the Disk (2328). The server is used to provide online support, while the disk is used provide offline support of a computer using the Keyed One-Way Hash. A disk would contain everything needed maintain offline secure communications, including extra keys, pools, and tables.

Figure 24:
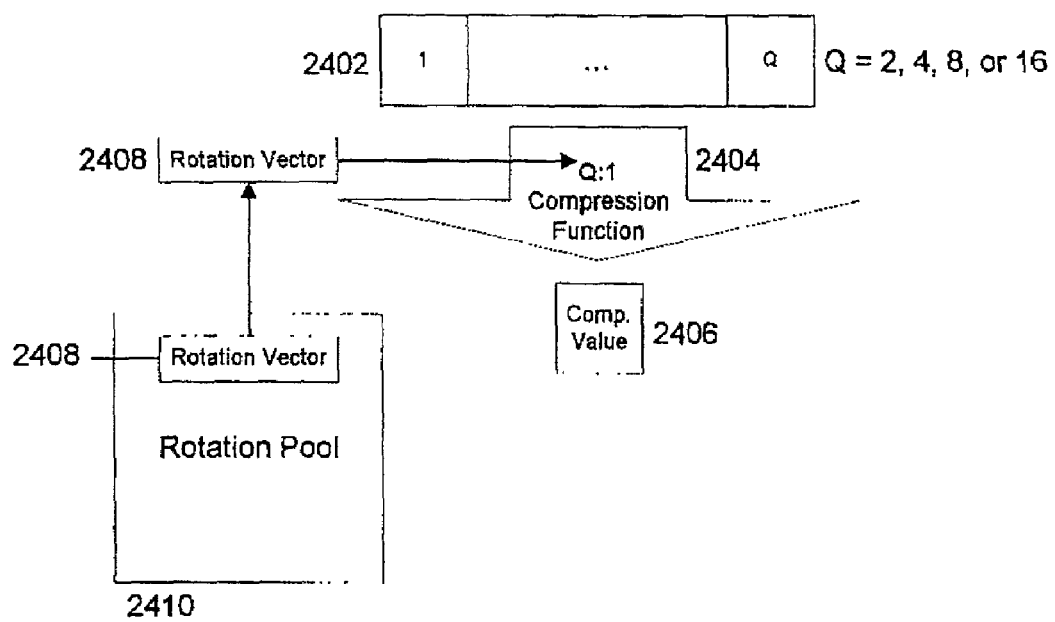
FIG. 24 depicts a diagram illustrating a data flow of a compression function according to the invention.

Referring to FIG. 24, the core Compression Function (2404) of the Keyed One-Way Hash, compresses an input array of 16 elements (2402), where each element is 4 bytes in size, resulting with an output of a Compressed Value (2406), which is 4 bytes in size. The compression ratio is 16:1. To prevent certain types of $2^{nd}$ pre-image attacks, a Rotation Vector (2408) composed of random bits is extracted from a Rotation Pool (2410), and is supplied to the Compression Function (2404). For each new use of the Compression Function a fresh Rotation Vector is extracted from the Rotation Pool. A Rotation Vector can never be reused. If no more Rotation Vectors can be extracted from the Rotation Pool then it must be refreshed from the Server or Disk.

While the example above results in a four byte Compressed Value, which is useful due to the limited space inside an IPv4 packet header, it could also result in larger values such as 16 bytes, 20 bytes or 32 bytes, by simply adjusting the compression ratio and the size of the Array of 4-byte Elements (2402). Also the size of each element in the array (2402) can be adjusted, however normally for perfomance reasons the native integer size for arithmetic operations of the host microprocessor should be selected.

Figure 25:
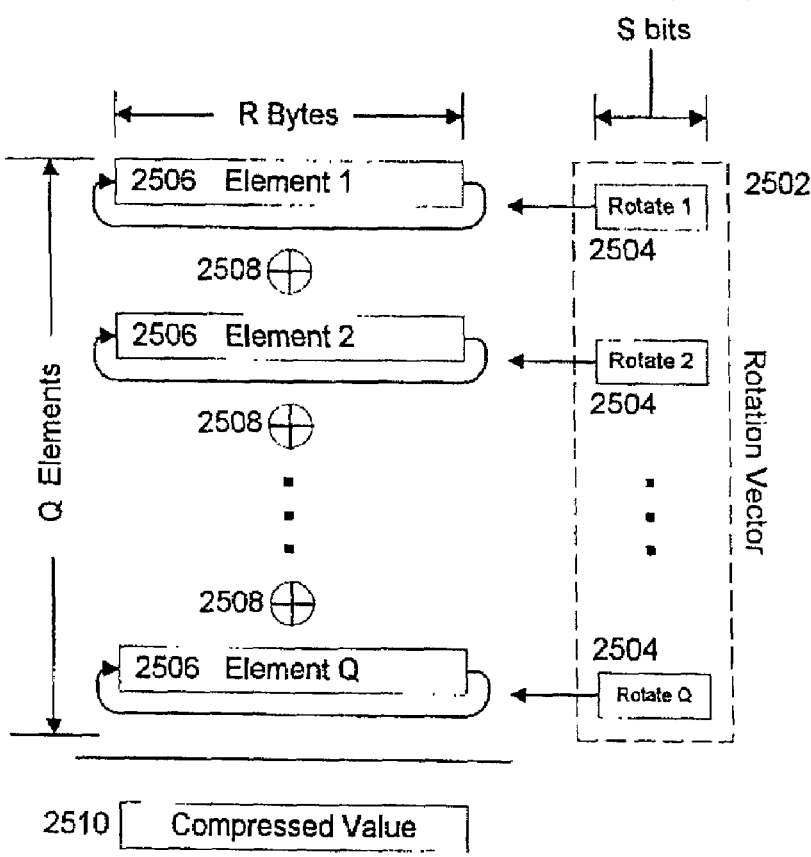
FIG. 25 depicts a diagram illustrating a data flow of compression calculation according to the invention.

Referring to FIG. 25, the mechanics of the compression function operate such that each 32-bit Element (2506) is rotated by a unique random 5 bits (2504). For example if the 5 bits of the $1^{st}$ Rotate Value (2504) contained the random value 7, then the corresponding $1^{st}$ Element (2506) would have it's 32 bits shifted left by 7 bits, where the leftmost original 7 bits would be copied to first 7 bits of the resulting 32 bits. A similar operation could use a right shift instead. The rotation on an Intel CPU would typically use the ROL or ROR machine operation for higher performance. These 5 bits come from the Rotation Vector (2502), and are $\log_2(32)$ bits in total, where 32 is the bit size of the 4-byte integer value to be rotated. The Rotation Vector is a total of 80 bits, which is calculated from 5 bits times the compressed ratio of 16, or 10 bytes. After the random rotation of each Element they are XOR'd together (2508), 15 times, and the result is a four byte Compressed Value (2510).

Figure 26:
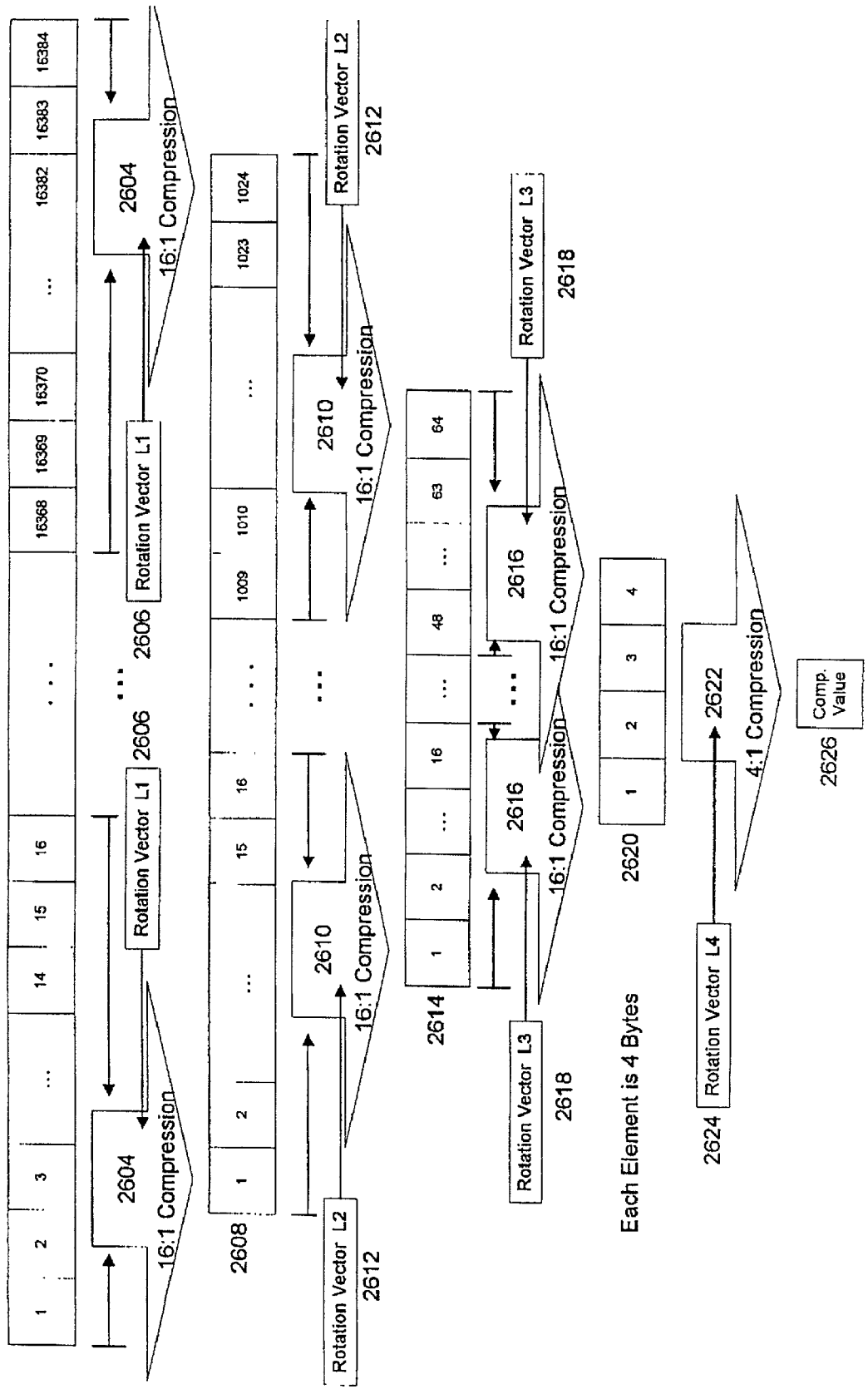
FIG. 26 depicts a diagram illustrating a process of compressing a message according to the invention.

Referring to FIG. 26, to compress a 64 Kilobyte data buffer (2602), divided into 16384 4-byte Elements, a 16:1 compression function (2604) can be used 1024 times, each with a ten byte Rotation Vector L1 (2606). The resulting 1024 4-byte Elements (2608) can be 16:1 compressed again (2610) 64 times, each with a ten byte Rotation Vector L2 (2612). The resulting 64 4-byte Elements (2614) can be 16:1 compressed yet again (2616) 4 times, each with a ten byte Rotation Vector L3 (2618). Finally the resulting four 4-byte Elements (2620) can be 4:1 compressed (2622), with a 2½ byte Rotation Vector L4 (2624), with a resulting final four byte Compressed Value (2626).

Figure 27:
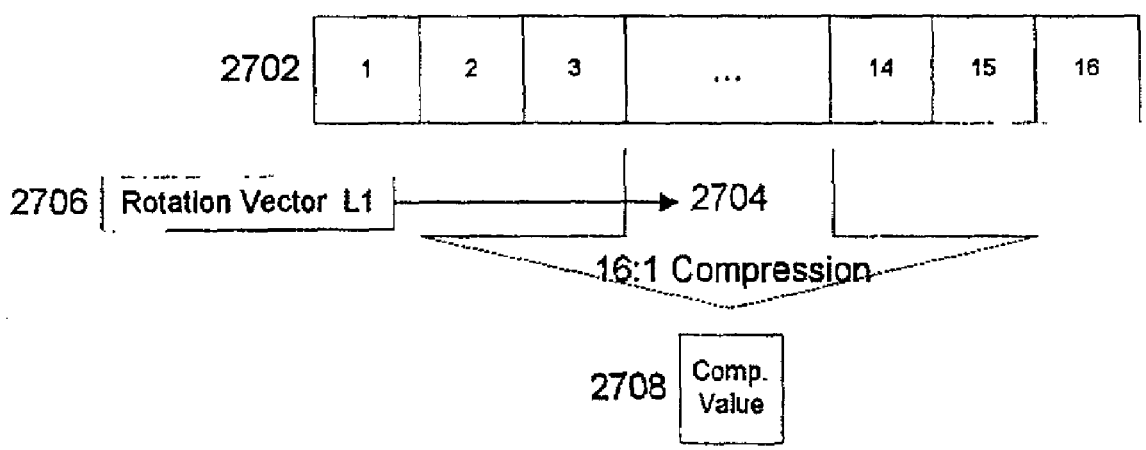
FIG. 27 depicts a diagram illustrating a process of compressing a message according to the invention.

Referring to FIG. 27, to compress a 64 byte data buffer (2702), divided into sixteen 4-byte Elements, a 16:1 compression function (2704) can be used once, with a ten byte Rotation Vector L1 (2706), resulting with a final four byte Compressed Value (2708).

Figure 28:
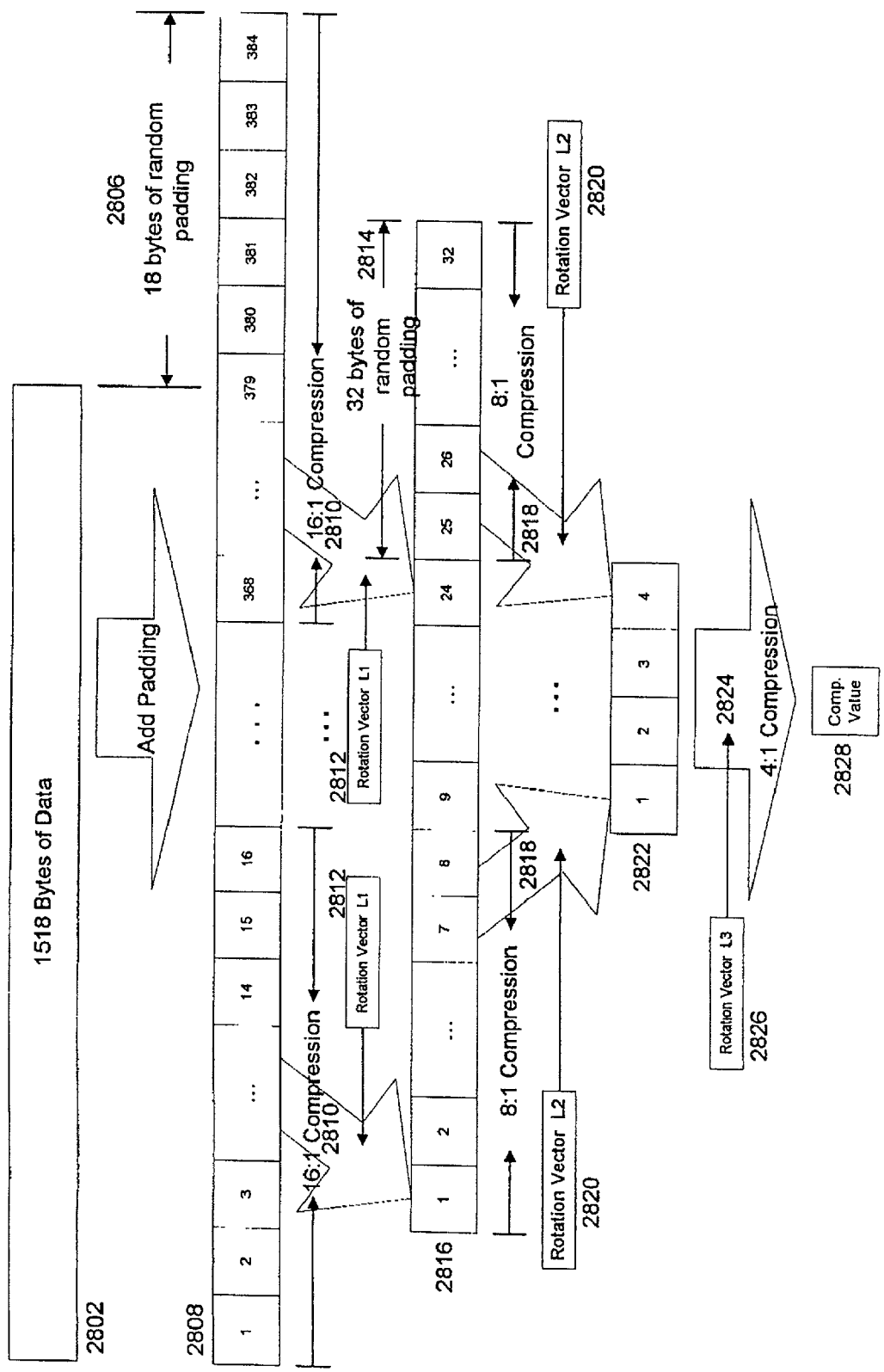
FIG. 28 depicts a diagram illustrating a process of compressing a message according to the invention.

Referring to FIG. 28, to compress a 1518 Byte data buffer (2802), it is first padded with 18 random bytes (2806), which come from the Padding Pool, resulting in 384 4-byte Elements (2808). A 16:1 compression function (2810) can be used 24 times, with a ten byte Rotation Vector L1 (2812). The resulting 24 4-byte Elements are padded with 32 random bytes (2814), which come from the Random Padding Pool, to end up with 32 4-byte Elements (2816). An 8:1 compression function (2818) can be used four times, with a five byte Rotation Vector L2 (2820). Finally the resulting four 4-byte Elements (2822) can be 4:1 compressed (2824), with a 2½ byte Rotation Vector L3 (2826), resulting with a four byte Compressed Value (2828).

Figure 29:
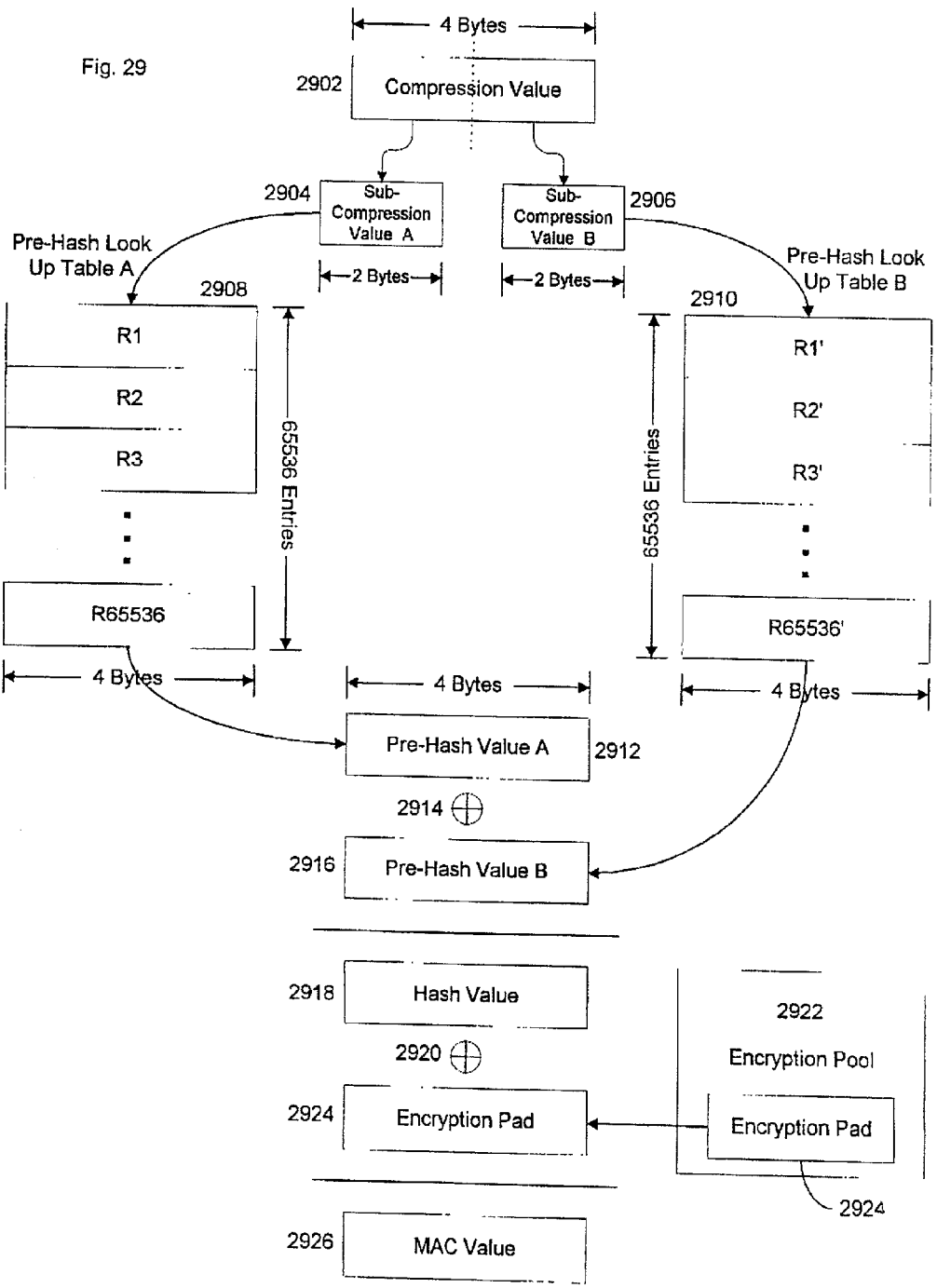
FIG. 29 depicts a diagram illustrating a data flow of MAC Value calculation according to the invention.

Referring to FIG. 29, after calculating a Compression Value (2902), of four bytes, the Compression Value (2902) is split into Sub-Compression Value A (2904) and Sub-Compression Value B (2906), each two bytes in size. Pre-Hash Look Up Table A (2908) is filled with 65536 entries, each consisting of a random four bytes from the PRNG. Likewise Pre-Hash Look Up Table B (2910) is filled with 65536 entries, each consisting of a random four bytes from the Server's PRNG. The Sub-Compression Value A is then used as an index into Pre-Hash Look Up Table A to extract a random number, four bytes in size, a Pre-Hash Value A (2912). Likewise the Sub-Compression Value B is then used as an index into Pre-Hash Look Up Table B to extract a random number, four bytes in size, a Pre-Hash Value B (2916). They are then XOR'd together (2914) to create a Hash Value (2918). These series of operations are designed to prevent a $1^{st}$ pre-image attack working backwards from the Hash Value. To further protect the Hash Value (2918), a four byte Encryption Pad (2924) is extracted from an Encryption Pool (2922) of 2 megabytes in size, which is the total amount of hash data expected to be operated on over a period of time, and XOR'd with it (2920) to produce the four byte MAC Value (2926). Each Encryption Pad (2924) is unique and can never be reused. If no more unique Encryption Pads can be extracted from the Encryption Pool then it is either refreshed from the Server's PRNG or from new PRNG bits stored on the Disk. If the stored PRNG bits are exhausted on the Disk then a new Disk must be manufactured by the Disk Manufacturing Utility, using it's PRNG. The new Disk then replaces the old, exhausted Disk.

Another embodiment of the invention would take a Compression Value of 16 bytes and divide it into eight sub-Compression Value's, which in turn is an index to eight separate Pre-Hash Look Up Tables of 65536 16-byte random value entries. The resulting eight indices are XOR'd together to form the 16-byte Hash Value. This in turn is XOR'd with a 16-byte Encryption Pad and results in a 16-byte MAC Value.

Figure 30:
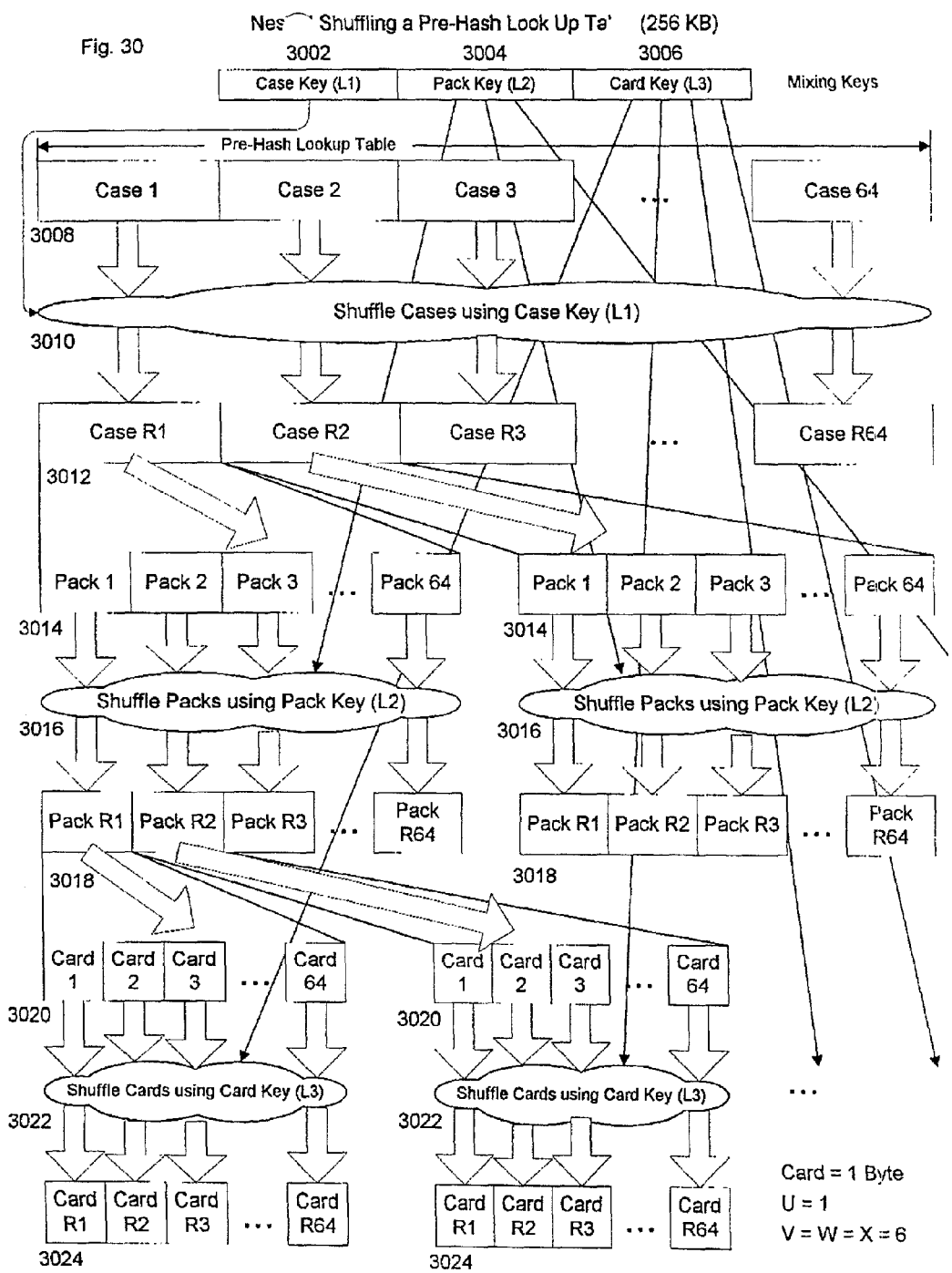
FIG. 30 depicts a diagram illustrating a data flow of nested shuffling a pre-hash table according to the invention.

Referring to FIG. 30, the operation to nested shuffle a Pre-Hash Look Up Tables Source of 512 Kilobytes utilizes three Mixing Seeds; a Case Seed (3002), a Pack Seed (3004) and a Card Seed (3006), each having 64 unique random numbers. The Pre-Hash Look Up Tables Source is partitioned into 64 Cases (3008). The Cases (3008) are all shuffled together randomly (3010), using the Case Seed (3002) to determine the shuffle pattern, and results in a random sequence of Cases (3012). Each Case is further partitioned into 64 Packs (3014). The Packs (3014) within each Case are shuffled together randomly (3016), using the Pack Seed (3004) to determine the shuffle pattern, and results in a random sequence of Packs (3018), identically shuffled per Case. Each Pack within each Case is further partitioned into 64 Cards (3020) of one byte each. The Cards (3020) within each Pack are shuffled together randomly (3022), using the Card Seed (3006) to determine the shuffle pattern, and results in a random sequence of Cards (3024), identically shuffled per Pack. These three levels of shuffling, Level 1 (L1), Level 2 (L2) and Level 3 (L3), result in a randomly shuffled Pre-Hash Look Up Tables Source, which has $(2^{92})^3$ or $2^{276}$ random permutations, i.e. entropy of 276 bits.

Figure 31:
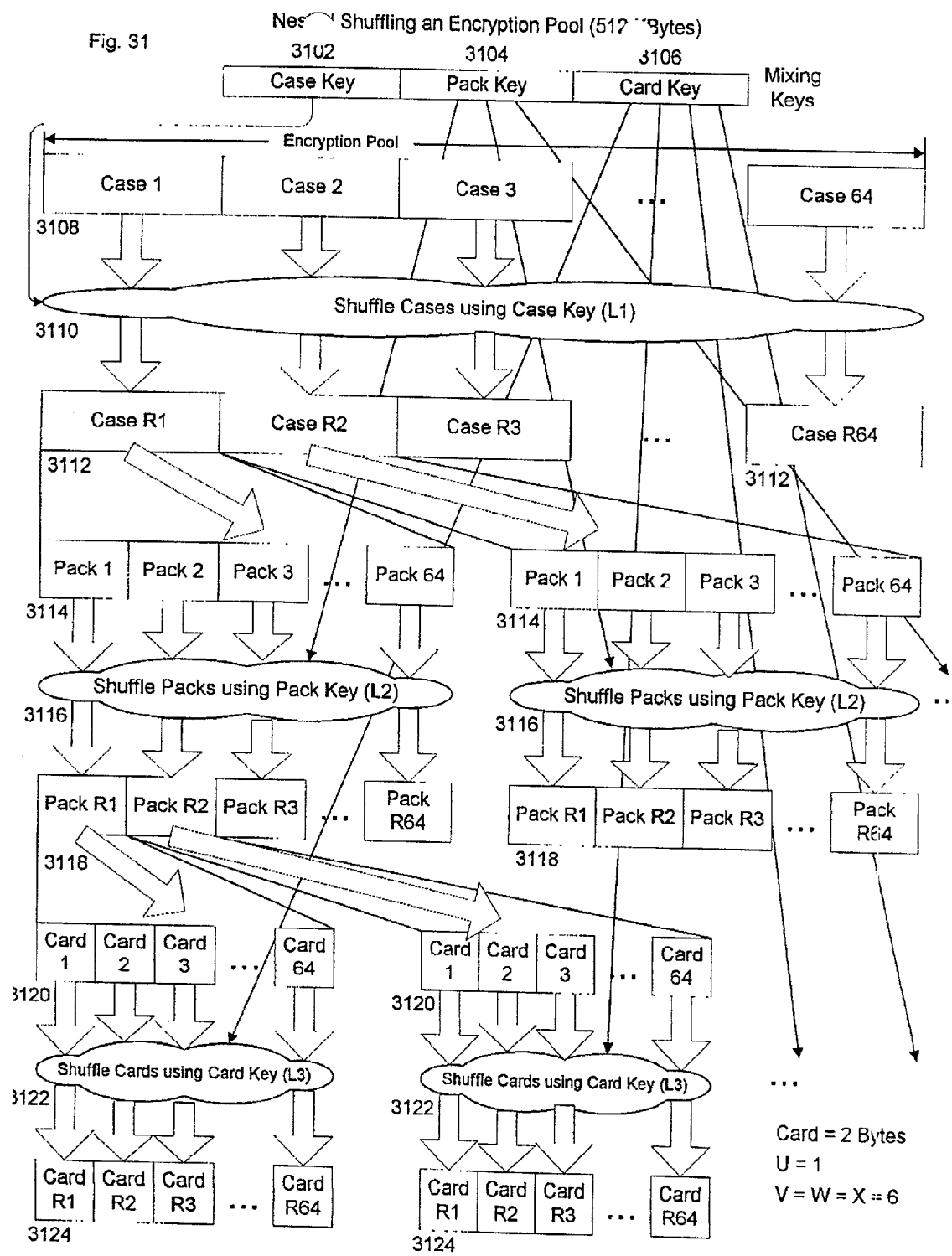
FIG. 31 depicts a diagram illustrating a data flow of nested shuffling an encryption pool according to the invention.

Referring to FIG. 31, the operation to nested shuffle a Encryption Pool of 512 Kilobytes utilizes three Mixing Seeds; a Case Seed (3102), a Pack Seed (3104) and a Card Seed (3106), each having 64 unique random numbers. The Encryption Pool is partitioned into 64 Cases (3108). The Cases (3108) are all shuffled together randomly (3110), using the Case Seed (3102) to determine the shuffle pattern, and results in a random sequence of Cases (3112). Each Case is further partitioned into 64 Packs (3114). The Packs (3114) within each Case are shuffled together randomly (3116), using the Pack Seed (3104) to determine the shuffle pattern, and results in a random sequence of Packs (3118), identically shuffled per Case. Each Pack within each Case is further partitioned into 64 Cards (3120) of one byte each. The Cards (3120) within each Pack are shuffled together randomly (3122), using the Card Seed (3106) to determine the shuffle pattern, and results in a random sequence of Cards (3124), identically shuffled per Pack. These three levels of shuffling, Level 1 (L1), Level 2 (L2) and Level 3 (L3), result in a randomly shuffled Encryption Pool, which has $(2^{92})^3$ or $2^{276}$ random permutations, i.e. entropy of 276 bits.

Figure 32:
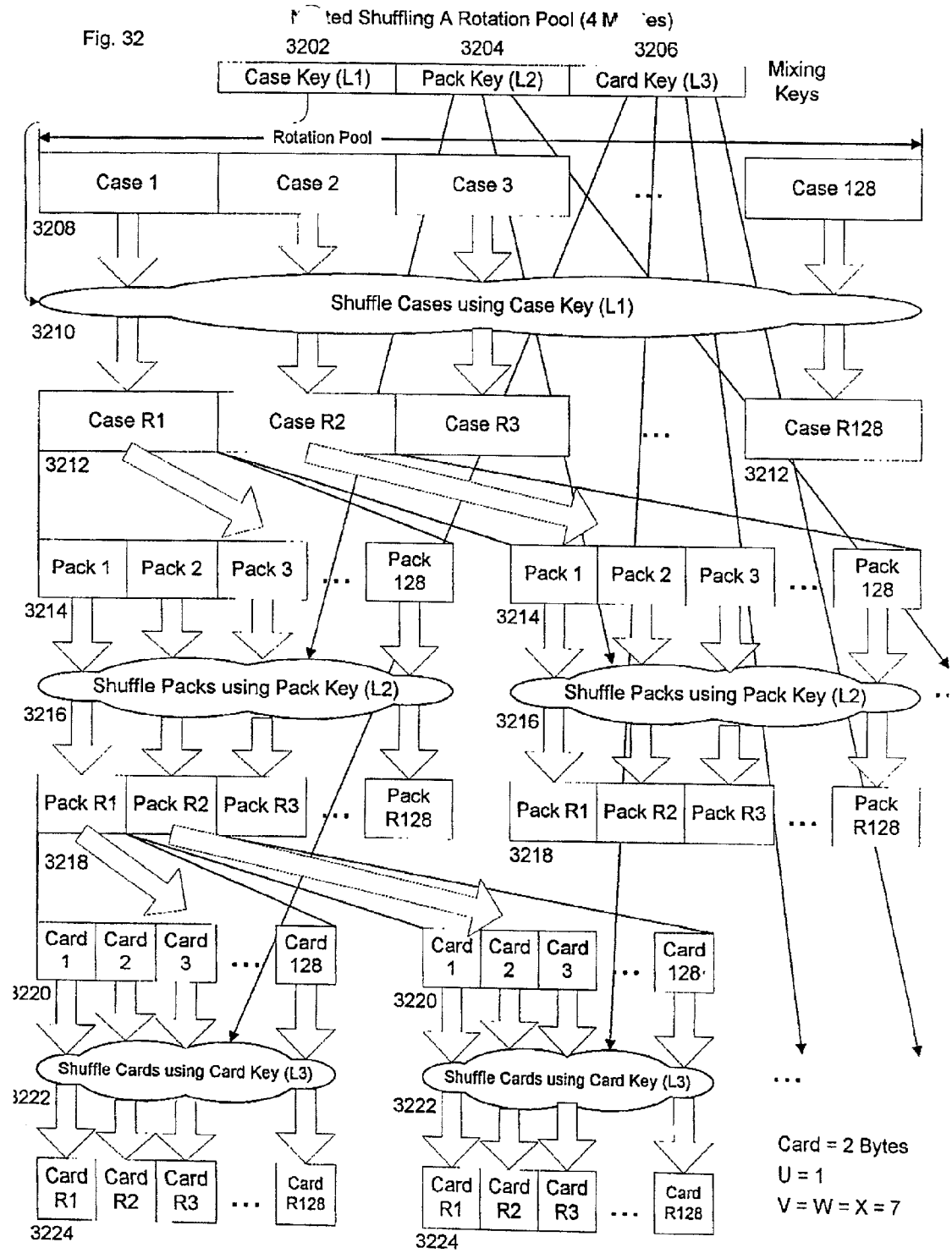
FIG. 32 depicts a diagram illustrating a data flow of nested shuffling a rotation pool according to the invention.

Referring to FIG. 32, the operation to nested shuffle a Rotation Pool of four megabytes utilizes three Mixing Seeds; a Case Seed (3202), a Pack Seed (3204) and a Card Seed (3206), each having 128 unique random numbers. The Rotation Pool is partitioned into 128 Cases (3208). The Cases (3208) are all shuffled together randomly (3210), using the Case Seed (3202) to determine the shuffle pattern, and results in a random sequence of Cases (3212). Each Case is further partitioned into 128 Packs (3214). The Packs (3214) within each Case are shuffled together randomly (3216), using the Pack Seed (3204) to determine the shuffle pattern, and results in a random sequence of Packs (3218), identically shuffled per Case. Each Pack within each Case is further partitioned into 128 Cards (3220) of one byte each. The Cards (3220) within each Pack are shuffled together randomly (3222), using the Card Seed (3206) to determine the shuffle pattern, and results in a random sequence of Cards (3224), identically shuffled per Pack. These three levels of shuffling, Level 1 (L1), Level 2 (L2) and Level 3 (L3), result in a randomly shuffled Rotation Pool, which has $(2^{220})^3$ or $2^{660}$ random permutations, i.e. entropy of 660 bits.

Figure 33:
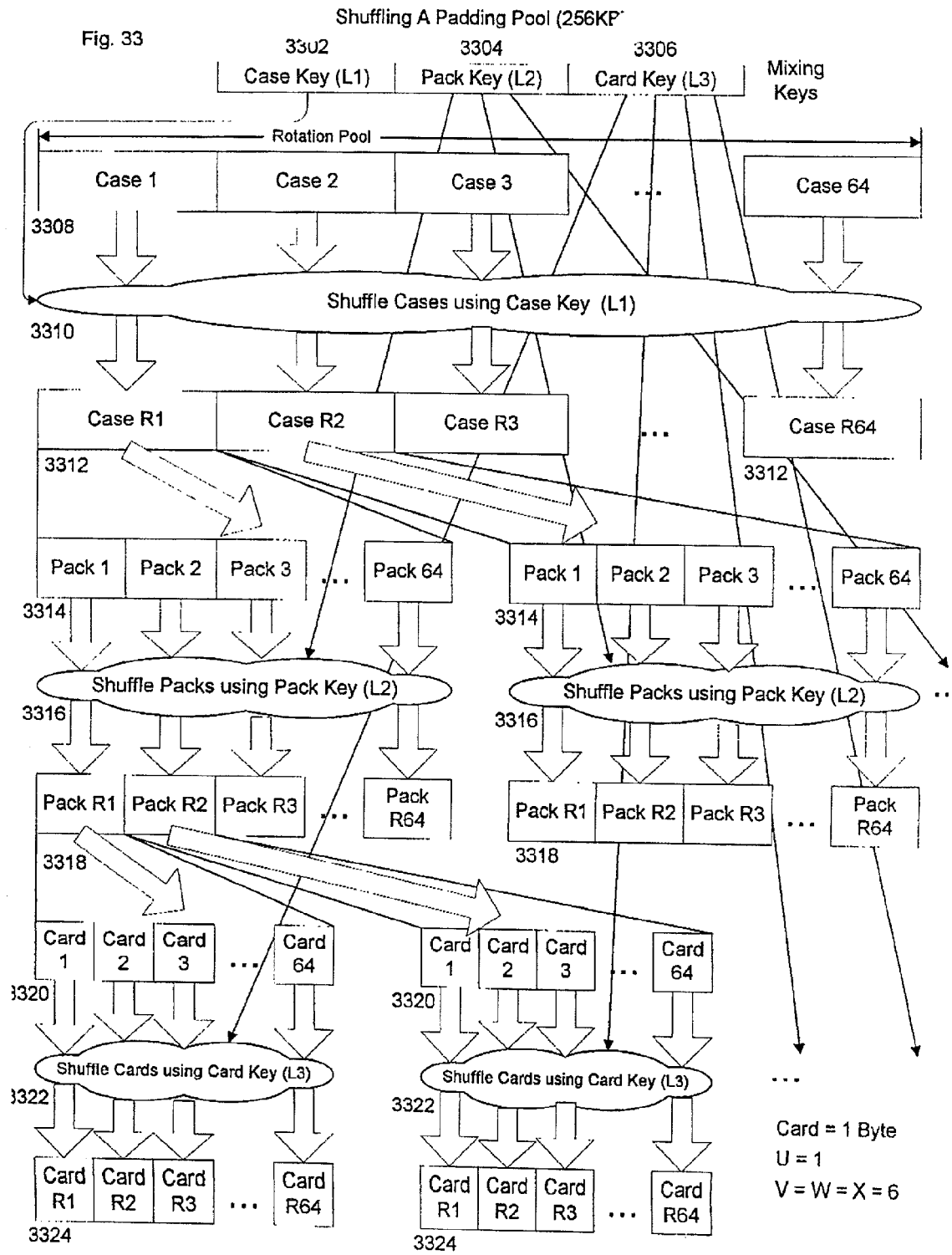
FIG. 33 depicts a diagram illustrating a data flow of nested shuffling a padding pool according to the invention.

Referring to FIG. 33, the operation to nested shuffle a Random Padding Pool of 256 kilobytes utilizes three Mixing Seeds; a Case Seed (3302), a Pack Seed (3304) and a Card Seed (3306), each having 64 unique random numbers. The Random Padding Pool is partitioned into 64 Cases (3308). The Cases (3308) are all shuffled together randomly (3310), using the Case Seed (3302) to determine the shuffle pattern, and results in a random sequence of Cases (3312). Each Case is further partitioned into 64 Packs (3314). The Packs (3314) within each Case are shuffled together randomly (3316), using the Pack Seed (3304) to determine the shuffle pattern, and results in a random sequence of Packs (3318), identically shuffled per Case. Each Pack within each Case is further partitioned into 64 Cards (3320) of one byte each. The Cards (3320) within each Pack are shuffled together randomly (3322), using the Card Seed (3306) to determine the shuffle pattern, and results in a random sequence of Cards (3324), identically shuffled per Pack. These three levels of shuffling, Level 1 (L1), Level 2 (L2) and Level 3 (L3), result in a randomly shuffled Random Padding Pool, which has $(2^{92})^3$ or $2^{276}$ random permutations, i.e. entropy of 276 bits.

Figure 34:
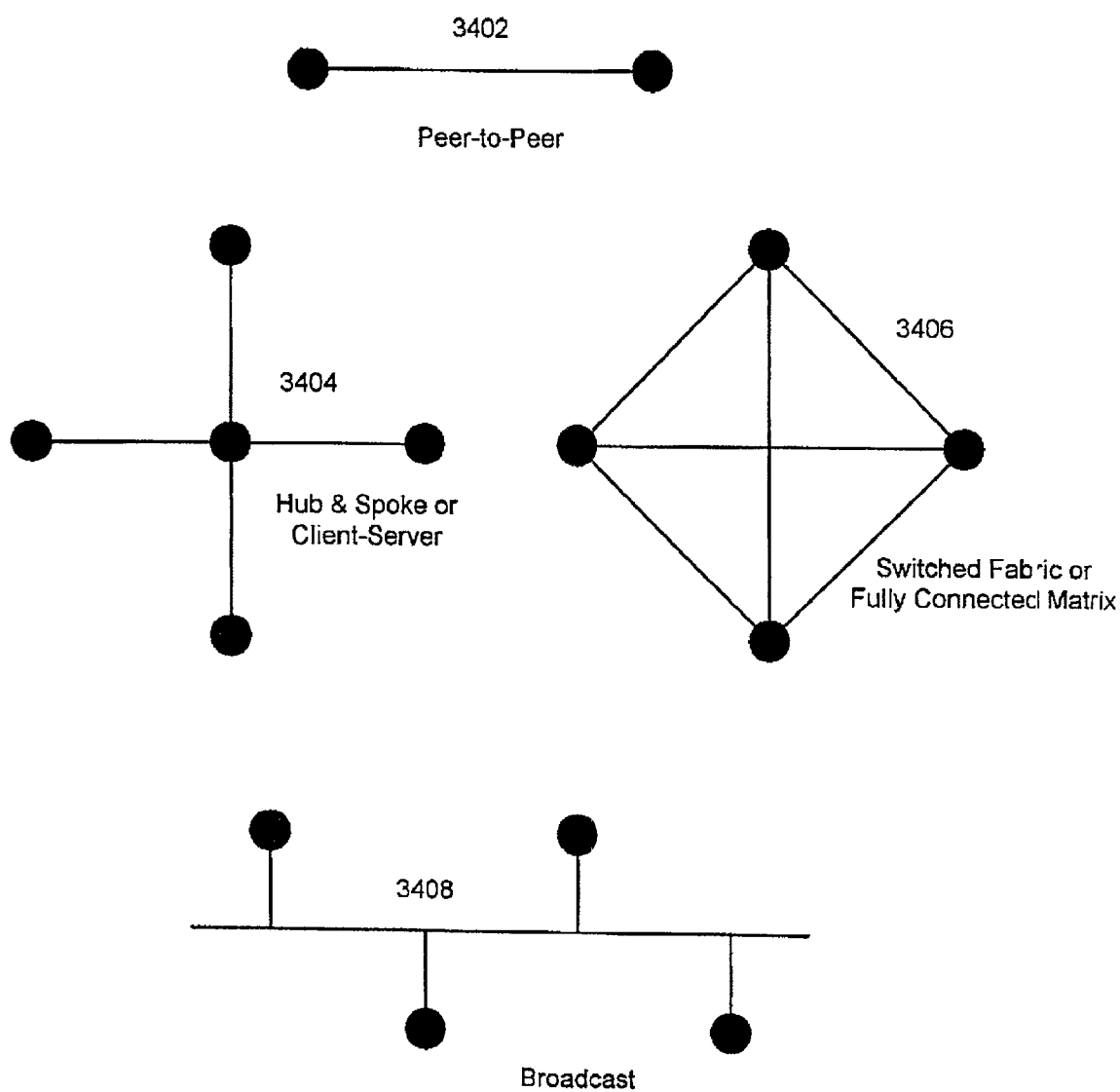
FIG. 34 depicts a diagram illustrating a variety of ways to connect communicating computers.

Referring to FIG. 34, these solid circle and attached line drawings demonstrate the various ways computers (the solid circles) can communicate securely (the lines). A peer-to-peer connection (3402) shows two computers communicating securely. A hub-and-spoke connection model (3404) shows how a server computer may communicate securely with outlying client computers. A fully meshed network (3406) shows how peers, such as optical switches, may communicate securely with any one of the others directly. A broadcast network (3408) shows how a group of computers may share a communications channel in order to securely communicate with one another.

The Non-Cyclic Pseudo-Random Number Generator

The non-cyclic pseudo-random number generator of this invention provides a secure and efficient mechanism for magnifying the output of a slower hardware random number generator. It does so without introducing bias or predictable number sequences. It generates the random bits in such a manner as to minimize the burden on the host computer and to take full advantage the performance capabilities of modern microprocessor architectures.

In addition, its overall strength is based on its secret buffers and seeds, not in the algorithm's complexity. This means that if any secret or seed is compromised wholly or partially the generator can be quickly repaired with a new secret or seed. If the generator is considered too weak for whatever reason, then larger secrets and longer seeds can be introduced swiftly and easily without requiring significant redesign or changes to existing generator implementations in software or hardware, with the possible exception of additional memory.

The Vernam Stream Cipher

The Vernam stream cipher of this invention provides a secure and efficient mechanism for transmitting encrypted data between sender and receiver computers. It does not introduce any extra bytes into the encrypted stream. It encrypts and decrypts in such a manner as to minimize the burden on the host computer and to take full advantage the performance capabilities of modern microprocessor architectures.

In addition, its overall strength is based on its shared secret buffers and keys, not in the algorithm's complexity. This means that if any secret or key is compromised wholly or partially the cipher can be quickly repaired with a new secret or key. If the cipher is considered too weak for whatever reason, then larger secrets and longer keys can be introduced swiftly and easily without requiring significant redesign or changes to existing cipher implementations in software or hardware, with the possible exception of additional memory.

Furthermore, the Vernam Stream Cipher has the additional advantages in that
- it can support a fully meshed network of N computers, involving $\frac{1}{2} \times (N^2 - N)$ encrypted connections;
- it can support encrypted broadcasts to multiple computers simultaneously;
- it can be seamlessly integrated with the Keyed One-Way Hash.

The Keyed One-Way Hash

The Keyed One-Way Hash, or message authentication code (MAC), of this invention provides a highly secure and efficient mechanism for transmitting a code authenticating the data sent between sender and receiver computers. It compresses in such a manner as to minimize the burden on the host computer and to take full advantage the performance capabilities of modern microprocessor architectures.

In addition, its overall strength is based on its shared secret buffers, tables and one-time pad, not in the algorithm's complexity. This means that if any secret, table or pad is compromised wholly or partially the keyed one-way hash can be quickly repaired with a new secret, table or pad. If the hash is considered too weak for whatever reason, then larger secrets, tables and pad can be introduced swiftly and easily without requiring significant redesign or changes to existing cipher implementations in software or hardware, with the possible exception of additional memory.

Furthermore, the Keyed One-Way Hash has the additional advantages in that
- it can support a fully meshed network of N computers, involving $\frac{1}{2} \times (N^2 - N)$ encrypted connections;
- it can support encrypted broadcasts to multiple computers;
- it can be seamlessly integrated with a Vernam Stream Cipher.

The foregoing descriptions of specific embodiments of the invention have been presented for purposes of illustration and description. They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A method for enciphering a sequence of clear text data values comprising:
   a. nested shuffling each of a plurality of large random secrets, using a plurality of mixing keys thus forming a plurality of shuffled large random secrets wherein each of the plurality of large random secrets is a random value and further wherein the plurality of shuffled large random secrets are each a random value and wherein the plurality of mixing keys are random and secret;
   b. performing an exclusive OR on the plurality of shuffled large random secrets to produce a plurality of large random pads;
   c. circularly rotating the values of each of the plurality of large random pads according to a plurality of random rotation values thus forming a plurality of rotated large random pads wherein the plurality of random rotation values are random and secret;
   d. randomly shuffling a portion of each of the plurality of rotated large random pads according to a plurality of working keys thus forming a plurality of randomly rotated and randomly shuffled large random pads wherein the plurality of working keys are random and secret;
   e. performing an exclusive OR function on the plurality of randomly rotated and randomly shuffled large random pads to produce a final pad;
   f. selecting a portion of the final pad to form a finite key stream; and
   g. performing an exclusive OR function with the finite key stream with the sequence of clear text data values.

2. The method according to claim 1 further comprising substituting a value within each of the plurality of shuffled large random secrets with a new random value using a plurality of substitution keys thus forming a plurality of nested shuffled and substituted large random secrets.

3. The method according to claim 1 further comprising substituting a value within each of the plurality of large random secrets with a new random value using a plurality of substitution keys thus forming a plurality of substituted large random secrets.

4. The method according to claim 1 further comprising selecting a series of portions of the final pad to form the finite key stream.

5. The method according to claim 1 further comprising transmitting the plurality of large random secrets, a plurality of substitution keys, the plurality of mixing keys, the plurality of working keys and the plurality of rotation values from a central server.

6. The method according to claim 1 further comprising transmitting the plurality of large random secrets, a plurality of substitution keys, the plurality of mixing keys, the plurality of working keys and the plurality of rotation values from a storage device.

7. A method for deciphering a sequence of cipher text data values comprising:
   a. nested shuffling each of a plurality of large random secrets, using a plurality of mixing keys thus forming a plurality of shuffled large random secrets wherein each of the plurality of large random secrets is a random value and further wherein the plurality of shuffled large random secrets are each a random value and wherein the plurality of mixing keys are random and secret;
   b. performing an exclusive OR on the plurality of shuffled large random secrets to produce a plurality of large random pads;
   c. circularly rotating the values of each of the plurality of large random pads according to a plurality of random rotation values thus forming a plurality of rotated large random pads wherein the plurality of random rotation values are random and secret;
   d. randomly shuffling a portion of each of the plurality of rotated large random pads according to a plurality of working keys thus forming a plurality of randomly rotated and randomly shuffled large random pads wherein the plurality of working keys are random and secret;
   e. performing an exclusive OR function on the plurality of randomly rotated and randomly shuffled large random pads to produce a final pad;
   f. selecting a portion of the final pad to form a finite key stream; and
   g. performing an exclusive OR function with the finite key stream with the sequence of cipher text data values.

8. method according to claim 7 further comprising substituting a value within each of the plurality of shuffled large random secrets with a new random value using a plurality of substitution keys thus forming a plurality of nested shuffled and substituted large random secrets.

9. The method according to claim 7 further comprising selecting a series of portions of the final pad to form the finite key stream.

10. The method according to claim 7 further comprising transmitting the plurality of large random secrets, a plurality of substitution keys, the plurality of mixing keys, the plurality of working keys and the plurality of rotation values from a central server.

11. The method according to claim 7 further comprising transmitting the plurality of large random secrets, a plurality of substitution keys, the plurality of mixing keys, the plurality of working keys and the plurality of rotation values from a storage device.

* * * * *